US 6,729,126 B2

(12) United States Patent
Ogiso et al.

(10) Patent No.: US 6,729,126 B2
(45) Date of Patent: May 4, 2004

(54) INTERNAL COMBUSTION ENGINE HAVING VARIABLE VALVE CONTROL SYSTEM AND NOX CATALYST

(75) Inventors: Makoto Ogiso, Susono (JP); Shouji Katsumata, Gotemba (JP); Kazuhiko Shiratani, Susono (JP); Keiji Yoeda, Numazu (JP); Hideyuki Nishida, Susono (JP); Tomomi Yamada, Susono (JP); Takamitsu Asanuma, Susono (JP); Yoshihiro Iwashita, Suntou-gun (JP); Kiyoshi Nakanishi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/329,459

(22) Filed: Dec. 27, 2002

(65) Prior Publication Data
US 2003/0106305 A1 Jun. 12, 2003

Related U.S. Application Data

(62) Division of application No. 09/808,203, filed on Mar. 15, 2001, now Pat. No. 6,519,933.

(30) Foreign Application Priority Data

Mar. 21, 2000 (JP) .......................... 2000-078986
Apr. 7, 2000 (JP) .......................... 2000-107101

(51) Int. Cl.⁷ ................................ F01N 3/00
(52) U.S. Cl. ...................... 60/285; 60/274; 60/295; 123/90.11; 123/90.15
(58) Field of Search .................. 60/274, 285, 286, 60/245, 300; 123/90.11, 90.15, 90.16, 90.17, 90.18

(56) References Cited

U.S. PATENT DOCUMENTS 5,398,502 A    3/1995    Watanabe .................... 60/284
5,765,372 A    6/1998    Mitobe et al. ................ 60/301
5,778,667 A    7/1998    Kinugasa et al. ............. 60/286

(List continued on next page.)

FOREIGN PATENT DOCUMENTS

| DE | 197 58 018 A 1 | 1/1999 |
| DE | 197 47 671 C 1 | 8/1999 |
| DE | 198 10 466 A 1 | 9/1999 |
| DE | 199 27 951 A 1 | 9/2000 |
| DE | 100 23 420 A 1 | 11/2000 |
| EP | 0 826 870 A2 | 4/1998 |
| EP | 0 849 441 A1 | 6/1998 |
| JP | 59-77025 | 5/1984 |
| JP | 61-28709 | 2/1986 |
| JP | 61-190118 | 8/1986 |
| JP | A 6-117225 | 4/1994 |
| JP | A 11-166430 | 6/1999 |

Primary Examiner—Thomas Denion
Assistant Examiner—Tu M. Nguyen
(74) Attorney, Agent, or Firm—Oliff & Berridge, PLC

(57) ABSTRACT

An apparatus is provided which includes an internal combustion engine of a lean-burn type, an NOx catalyst disposed in an exhaust passage of the engine so as to remove nitrogen oxides contained in exhaust gas emitted from the engine, and a variable valve control system capable of changing at least one of the opening and closing timing and a lift of the intake valve and/or the exhaust valve for each cylinder of the engine. The variable valve control system is controlled so that the exhaust gas to which the NOx catalyst is exposed is controlled so as to be suitable for removing a selected gaseous component from the NOx catalyst when the selected gaseous component should be removed. A method of purifying an exhaust gas emitted from the above engine is also provided.

8 Claims, 15 Drawing Sheets

U.S. PATENT DOCUMENTS

| | | | |
|---|---|---|---|
| 5,850,811 A | 12/1998 | Tomisawa et al. | 123/90.15 |
| 5,957,096 A | 9/1999 | Clarke et al. | 123/90.15 |
| 6,082,100 A * | 7/2000 | Boegner et al. | 60/274 |
| 6,119,452 A | 9/2000 | Kinugasa et al. | 60/285 |
| 6,195,987 B1 | 3/2001 | Miyashita | 60/285 |
| 6,233,921 B1 | 5/2001 | Enderle et al. | 60/285 |
| 6,237,330 B1 | 5/2001 | Takahashi et al. | 60/285 |
| 6,266,957 B1 | 7/2001 | Nozawa et al. | 60/285 |
| 6,269,632 B1 * | 8/2001 | Schmitz | 123/90.11 |
| 6,286,478 B1 | 9/2001 | Atago et al. | 123/90.11 |
| 6,293,095 B1 * | 9/2001 | Yamamoto et al. | 60/286 |
| 6,324,835 B1 | 12/2001 | Surnilla et al. | 60/274 |
| 6,341,487 B1 * | 1/2002 | Takahashi et al. | 60/285 |
| 6,557,505 B1 * | 5/2003 | Hori | 123/90.11 |
| 2002/0189240 A1 * | 12/2002 | Allevag et al. | 60/285 |

* cited by examiner

INTERNAL COMBUSTION ENGINE HAVING VARIABLE VALVE CONTROL SYSTEM AND NOX CATALYST

This is a Division of application Ser. No. 09/808,203 filed Mar. 15, 2001 now U.S. Pat. No. 6,519,933. The entire disclosure of the prior application is hereby incorporated by reference herein in its entirety.

INCORPORATION BY REFERENCE

The disclosures of Japanese Patent Applications No. 2000-078986 filed on Mar. 21, 2000 and No. 2000-107101 filed on Apr. 7, 2000, each including the specification, drawings and abstract, are incorporated herein by reference in its entirety.

BACKGROUND OF THE INVENTION

1. Field of the Invention

The invention relates in general to an internal combustion engine installed on a vehicle, such as an automotive vehicle, and more particularly to an internal combustion engine which includes a variable valve control system capable of changing the opening and closing timing and/or a lift of each of intake and exhaust valves mounted in the engine.

2. Description of Related Art

Internal combustion engines installed on automobiles have recently been desired to purify exhaust gases emitted from the engines of harmful gaseous components such as hydrocarbon (HC), carbon monoxide (CO) and nitrogen oxides (NOx) contained therein, before the exhaust gases are released into the atmosphere.

In order to meet the above-indicated demand, a known technique provides a three-way catalyst in the exhaust passage of the internal combustion engine. The three-way catalyst is arranged to reduce or remove hydrocarbon (HC), carbon monoxide (CO) and nitrogen oxides (NOx) contained in exhaust gases that have a predetermined air/fuel ratio equal to or close to the stoichiometric air/fuel ratio. For controlling the air/fuel ratio of the exhaust gases to which the three-way catalyst is exposed, the air/fuel ratio of an air-fuel mixture to be introduced into the engine is controlled in a feedback fashion, so that the exhaust gases emitted from the engine have the predetermined air-fuel ratio, enabling the three-way catalyst to purify the exhaust gases of desired harmful gaseous components.

On the other hand, internal combustion engines of lean-burn type have been developed for use on automobiles, in an effort to reduce the required amount of consumption of the fuel by the engine. The lean-burn type engine is capable of burning a fuel-lean air-fuel mixture the air/fuel ratio of which is higher than the stoichiometric value.

The exhaust gases to be emitted from such lean-burn type internal combustion engines have a relatively high air/fuel ratio, and contain a relatively small amount of reducing components such as hydrocarbon (HC), so that nitrogen oxides (NOx) contained in the exhaust gases can not be sufficiently reduced or removed by the three-way catalyst alone.

In view of the above situation, it has been proposed to use an occlusion-reduction type NOx catalyst disposed in the exhaust passage of the internal combustion engine. The occlusion-reduction type NOx catalyst is adapted to occlude or absorb nitrogen oxides (NOx) contained in fuel-lean exhaust gases to which the NOx catalyst is exposed when the exhaust gases have a fuel-lean air/fuel ratio, and to release the occluded nitrogen oxides (NOx) when the exhaust gases have a stoichiometric or fuel-rich air/fuel ratio. The released nitrogen oxides (NOx) are reduced into nitrogen ($N_2$) by reaction with the reducing agents or components such as hydrocarbon (HC) and carbon monoxide (CO) contained in the exhaust gases.

With the NOx catalyst of the occlusion-reduction type disposed in the exhaust passage of the lean-burn internal combustion engine, nitrogen oxides (NOx) contained in the exhaust gases are occluded or absorbed in the NOx catalyst, when the fuel-lean exhaust gases are emitted as a result of combustion of a fuel-lean air-fuel mixture within the engine.

When the internal combustion engine is operated with a stoichiometric or fuel-rich air-fuel mixture having the stoichiometric air/fuel ratio or an air/fuel ratio lower than the stoichiometric value, and the exhaust gases emitted from the engine are stoichiometric or fuel-rich, the occlusion-reduction type NOx catalyst releases the occluded nitrogen oxides (NOx), and the released nitrogen oxides are reduced into nitrogen ($N_2$).

The amount of nitrogen oxides (NOx) that can be occluded or stored in the occlusion-reduction type NOx catalyst is limited, and the capacity of the NOx catalyst to occlude nitrogen oxides (NOx) is saturated after a long period of operation of the engine with a fuel-lean air-fuel mixture, leading to a possibility of releasing the nitrogen oxides into the atmosphere without being reduced.

To avoid the above-indicated possibility, it has been practiced to perform so-called "rich spike" control when the NOx occlusion capacity of the occlusion-reduction type NOx catalyst is saturated during the lean-burn operation of the engine. In the "rich spike" control, the mode of operation of the engine is switched from the lean-burn mode to the rich-burn mode so that the NOx catalyst is exposed to fuel-rich exhaust gases having a relatively low air/fuel ratio.

However, merely increasing the amount of fuel injection into the engine undesirably causes a sudden increase of the output torque of the engine. To prevent this sudden increase, the fuel injection amount must be increased while the amount of air to be drawn into the engine is reduced. Accordingly, the rich spike control requires both of the fuel injector valve and the throttle valve to be controlled so as to increase the fuel injection amount while reducing the intake air amount.

The throttle valve is located some distance apart from the combustion chamber in each cylinder, and therefore the actual reduction of the air amount in the combustion chamber to a desired value requires a certain time after the moment at which the opening of the throttle valve was reduced. Thus, the switching of the engine operation mode from the lean-burn mode to the rich-burn mode requires a relatively long time due to a delayed control response of the throttle valve.

Further, the throttle valve and the fuel injector valve must be controlled again after the termination of the rich-spike control, in order to increase the air amount to be drawn into the cylinder of the engine and reduce the fuel amount to be injected into the cylinder. Like the switching of the engine operation upon initiation of the rich-spike control, the switching of the engine operation mode from the rich-burn mode to the lean-burn mode requires a relatively long time due to a delayed response of the throttle valve after the termination of the rich-spike control.

Thus, the rich-spike control requires a considerably long time due to the long periods of time required for switching the mode of operation of the engine operation between the lean-burn and rich-burn modes upon initiation and termination of the rich-spike control. This may cause undesired deterioration of the driveability of the vehicle and an unnecessary increase in the amount of consumption of the fuel.

Some of the lean-burn internal combustion engines such as diesel engines and lean-burn gasoline engines use the above-described NOx catalyst of the occlusion-reduction type or selective reduction type or other exhaust emission purifying device for purifying the exhaust gases emitted therefrom.

The selective reduction type NOx catalyst is a catalyst capable of reducing or decomposing nitrogen oxides (NOx) in an oxygen-rich atmosphere, in the presence of hydrocarbon (HC). For this selective reduction type NOx catalyst to be able to reduce or remove NOx, an appropriate amount of HC component is required. When the selective reduction type NOx catalyst is used to purify exhaust gases emitted from the above-indicated lean-burn internal combustion engines, the selective reduction type NOx catalyst needs to be supplied with the hydrocarbon (HC) component, since the amount of the HC component in the exhaust gases emitted during a normal lean-burn operation of the engine is extremely small. The supply of the HC component may be achieved by operating the engine with a fuel-rich or stoichiometric air-fuel mixture so that the exhaust gases emitted from the engine have the stoichiometric air/fuel ratio or an air/fuel ratio lower than the stoichiometric value.

As discussed above, the occlusion-reduction type NOx catalyst is adapted to occlude NOx when the emitted exhaust gases are fuel-lean, and release and reduce the occluded NOx when the oxygen concentration of the exhaust gases is reduced.

When the occlusion-reduction type NOx catalyst is used to purify exhaust gases to be emitted from the lean-burn internal combustion engines, NOx in the fuel-lean exhaust gases are occluded in the NOx catalyst during a normal lean-burn operation of the engine. The NOx cannot be occluded in the NOx catalyst after the NOx occlusion capacity of the catalyst is saturated as a result of the lean-burn operation of the engine for a long time. In this event, NOx is released into the atmosphere. To avoid this situation, it is necessary to cause the exhaust gases to be fuel-rich and to considerably reduce the oxygen concentration of the exhaust gases, at a suitable point of time before saturation of the NOx occlusion capacity of the NOx catalyst, in order to increase the amount of HC as a reducing agent, release the occluded NOx from the NOx catalyst and reduce the released NOx into $N_2$. In this manner, the NOx catalyst may be able to recover the original NOx occlusion capacity.

Thus, the emission purifying device utilizing the lean-burn NOx catalyst requires the supply of hydrocarbon (HC) as the reducing agent for reducing and removing NOx, and therefore requires the exhaust gases to be stoichiometric or fuel-rich from time to time. JP-A-6-17225 discloses one example of a method of controlling the exhaust gases to be stoichiometric or fuel-rich, which utilizes an auxiliary or secondary injection of fuel into the engine.

The auxiliary fuel injection is a fuel injection into the engine cylinder following the primary fuel injection into the engine cylinder made for providing the desired output torque of the engine. The auxiliary fuel injection takes place during the expansion stroke or exhaust stroke.

However, a portion of the fuel injected into the cylinder in the secondary fuel injection for the purpose of controlling the air/fuel ratio of the exhaust gases may be burned in the cylinder, increasing the output torque of the engine by a small amount, depending upon the operating condition of the engine, so that the vehicle drive force is increased with some shock, resulting in undesirable deterioration of the vehicle driveability. In this respect, it is desired to develop any suitable method of controlling the air/fuel ratio of the exhaust gases (or increasing HC as the reducing agent), other than the auxiliary fuel injection.

For controlling the exhaust gases to be stoichiometric or fuel-rich, there is also known a method in which the air-fuel mixture introduced into the combustion chamber is controlled to have the stoichiometric air/fuel ratio or an air/fuel ratio lower than the stoichiometric value. If the air/fuel ratio of the air-fuel mixture is immediately changed from a value higher than the stoichiometric value to the stoichiometric or lower value, however, there may be a risk of misfiring of the engine due to a delayed mixing of the air and the fuel into the desired air-fuel mixture. Accordingly, the air/fuel ratio of the air-fuel mixture must be sufficiently gradually changed from a lean level (that is higher than the stoichiometric value) to a rich level (that is lower than the stoichiometric value).

However, the gradual change of the air/fuel ratio requires a relatively long time until the desired stoichiometric or lower air/fuel ratio is reached. During this period of time, NOx is less likely to be reduced and removed by the selective reduction type NOx catalyst, or NOx releasing and reduction is less likely to be effected by the occlusion-reduction type NOx catalyst. In either of these two types of NOx catalysts, the NOx reducing/removing capability and the fuel economy of the engine are undesirably deteriorated.

SUMMARY OF THE INVENTION

It is therefore an object of the present invention to recover an NOx catalyst used in an internal combustion engine of a lean-burn type capable of burning an oxygen-rich air-fuel mixture, such that the NOx catalyst is placed, at an early opportunity, in a state suitable for reducing or removing selected gaseous components in exhaust gases emitted from the engine while the exhaust gases should be purified of the gaseous components, and such that the amount of consumption of the fuel by the engine is reduced.

To accomplish the above and/or other objects, one aspect of the present invention provides an apparatus comprising (a) an internal combustion engine of a lean-burn type capable of burning an oxygen-rich air-fuel mixture, which engine includes an intake valve and an exhaust valve for each of a plurality of cylinders thereof, (b) an NOx catalyst disposed in an exhaust passage of the internal combustion engine so as to remove nitrogen oxides contained in an exhaust gas emitted from the engine, (c) a variable valve control system capable of changing the opening and closing timing and/or a lift of at least one of the intake valve and the exhaust valve for each cylinder of the engine, and (d) a controller configured to control the variable valve control system to thereby control the exhaust gas to which the NOx catalyst is exposed, such that the controlled exhaust gas is suitable for removing a selected gaseous component from the NOx catalyst when the selected gaseous component should be removed.

In the apparatus of the invention constructed as described above, the controller is adapted to control the variable valve control system so as to control the exhaust gases emitted from the engine, such that the controlled exhaust gases permit the NOx catalyst to be recovered into an optimum state for reducing or removing the selected gaseous components in the exhaust gases that are emitted while the selected gaseous components should be removed.

The valve heads of the intake and exhaust valves in the closed states partially define the cylinders (combustion chambers) of the engine, and therefore the opening and closing timings and the amounts of lift of these valves will directly affect the condition of gases within the cylinders and the condition of exhaust gases to be emitted from the cylinders.

Accordingly, the exhaust gases emitted from the engine can be controlled in a short time by controlling the variable valve control system such that the controlled exhaust gases permit the NOx catalyst to be recovered into the state suitable for reducing or removing the selected components contained in the exhaust gases. Thus, the operation of the controller for recovering the NOx catalyst does not require an intolerably long time.

In particular, the time required for operating the internal combustion engine with a rich or stoichiometric air/fuel ratio for the purpose of removing the selected gas component(s) from the NOx catalyst can be shortened, and therefore the amount of fuel injected can be minimized, while at the same time suppressing deterioration of vehicle driveability.

Examples of the selected components to be reduced or removed from the NOx catalyst include nitrogen oxides (NOx) and sulfur oxides (SOx).

When the nitrogen oxides (NOx) are to be removed from the NOx catalyst, at least one reducing agent for reducing the nitrogen oxides is required. To this end, the controller may be adapted to control the variable valve control system such that the exhaust gases emitted form the internal combustion engine contain a large amount of reducing agent or agents.

The amount of the reducing agents contained in the exhaust gases can be increased, for example, by operating at least one of the cylinders of the engine with a fuel-rich air-fuel mixture having an air/fuel ratio lower than the stoichiometric value, so that the exhaust gases are fuel-rich, having a relatively low air/fuel ratio.

When at least one of the cylinders of the internal combustion engine is operated with a fuel-rich air-fuel mixture, the controller, such as an ECU, may be adapted to control the variable valve control system so as to shorten the period of opening of the intake valve of each cylinder in question, for example, so that the quantity of the air to be drawn into the cylinder is reduced to lower the air/fuel ratio of the air-fuel mixture to be burned in the cylinder. To further increase the amount of the reducing agents to be contained in the exhaust gases, the controller controls the fuel injection valve so as to increase the amount of the fuel to be injected into the cylinder in question, as well as controlling the variable valve control system so as to shorten the period of opening of the intake valve.

Although hydrocarbon (HC) is generally a typical reducing agent for reducing nitrogen oxides (NOx), hydrogen ($H_2$) and carbon monoxide (CO) which have a higher reducing ability than hydrocarbon (HC) may also be used as the reducing agents. Hydrogen ($H_2$) is produced in the combustion process of the air-fuel mixture, and carbon monoxide (CO) is produced by oxidization of hydrocarbon (HC). In view of this fact, the controller may be adapted to control the variable valve control system such that the exhaust gases emitted from the engine contain a large amount of hydrogen ($H_2$) and carbon monoxide (CO).

For instance, the amount of hydrogen ($H_2$) to be contained in the exhaust gases may be increased by advancing the moment of opening of the exhaust valve to a point of time before the moment of initiation of the exhaust stroke of the piston, that is, to a point of time in the expansion stroke of the piston, so that the air-fuel mixture being burned is expelled from the cylinder as part of the exhaust gases.

The amount of carbon monoxide (CO) to be contained in the exhaust gases may be increased, for instance, by retarding the moment of opening of the exhaust valve to a point of time after the moment of initiation of the exhaust stroke of the piston, so that the gases within the cylinder are sufficiently oxidized before they are exhausted from the cylinder.

When sulfur oxides (SOx) are to be removed from the NOx catalyst, in particular, when SOx poisoning of the NOx catalyst is to be eliminated, the NOx catalyst need to be exposed to a hot fuel-rich atmosphere. To this end, the controller may be adapted to control the variable valve control system such that the exhaust gases emitted form the engine are hot and relatively fuel-rich.

The temperature of the exhaust gases may be raised, for example, by advancing the opening timing of the exhaust valve of the cylinder in question so that the gases which have been just burned in the cylinder are discharged from the cylinder. The air/fuel ratio of the exhaust gases can be reduced by shortening the period of opening of the intake valve, by retarding the moment of opening of the intake valve and/or advancing the moment of closing of the intake valve, or alternatively by controlling the fuel injector valve so as to increase the amount of fuel injected into the cylinder.

In the case where the internal combustion engine according to the invention is equipped with spark plugs, the temperature of the burned gases upon opening of the exhaust valve of the cylinder in question can be further raised by advancing the moment of opening of the exhaust valve and retarding the ignition timing of the corresponding spark plug to retard the moment of combustion of the air-fuel mixture.

The NOx catalyst of the internal combustion engine of the invention may be, for instance, an NOx catalyst of an occlusion-reduction type adapted to occlude or absorb nitrogen oxides (NOx) contained in fuel-lean exhaust gases to which the NOx catalyst is exposed, and to release and reduce the occluded nitrogen oxides (NOx) when the exhaust gases are stoichiometric or fuel-rich. Alternatively, the NOx catalyst may be of a selective reduction type adapted to reduce or decompose nitrogen oxides (NOx) contained in the exhaust gases when the exhaust gases are fuel-lean and contain a reducing agent or agents.

In the internal combustion engine of the invention, the variable valve control system is preferably controlled so as to prevent a variation in the drive torque produced by the engine, while controlling the exhaust gases such that the controlled exhaust gases permit the NOx catalyst to be recovered into its optimum state for reducing or removing the selected gaseous components.

In the above instance, the selected components can be removed with a high degree of control response, while minimizing the drive torque variation of the internal combustion engine.

Another aspect of the invention provides an apparatus comprising: (a) an internal combustion engine of a lean-burn type capable of burning an oxygen-rich air-fuel mixture, which engine includes an intake valve and an exhaust valve for each of a plurality of cylinders thereof, (b) an NOx catalyst disposed in an exhaust passage of the internal combustion engine, (c) a variable valve control system capable of changing the opening and closing timing of the exhaust valve for said each cylinder of the engine, and (d) a controller configured to control the variable valve control system so as to placed the exhaust valve in an open position before a moment of initiation of an exhaust stroke of a corresponding one of the cylinders, when an exhaust gas emitted from the corresponding cylinder is desired to contain a reducing component for reducing NOx.

Preferably, the exhaust valve is opened after a moment of injection of a fuel into the corresponding cylinder.

By opening the exhaust valve within the period between the moment of the fuel injection and the moment of initiation of the exhaust stroke, a portion of the fuel injected into a combustion chamber of the engine can be introduced into the lean-burn NOx catalyst before that portion of the fuel has been burned within the combustion chamber. Since the above control is executed immediately after the controller determines that the learn-burn NOx catalyst requires a reducing agent or agents, the purification efficiency of the catalyst can be improved while minimizing otherwise possible deterioration of the fuel economy.

In the internal combustion engine including the variable valve control system according to the second aspect of the instant invention, the controller is preferably operated to control the variable valve timing control mechanism such that the exhaust valve is held open during at least a period between the moment of the fuel injection and the moment of ignition of the air-fuel mixture.

However, the exhaust valve may be opened prior to the moment of initiation of the fuel injection, and may be closed during the fuel injection. Further, the exhaust valve may be opened only once or two or more times in one cycle of operation of the engine.

When the internal combustion engine has a plurality of cylinders, the above-described control operation to open the exhaust valve at an appropriate time other than during the exhaust stroke may be performed with respect to all of the cylinders or a selected one or ones of the cylinders. When the engine has a plurality of exhaust valves for one cylinder, the above-described control operation may be performed with respect to all of the exhaust valves of the cylinder or for only a selected one or ones of the exhaust valves.

The variable valve control system provided in the internal combustion engine according to the first or second aspect of this invention may include an electromagnetic drive mechanism operable to generate electromagnetic force by application of electric current thereto, for bidirectionally moving the exhaust valves and/or the intake valves. Alternatively, the variable valve control system may include a hydraulic drive mechanism operated with a pressurized fluid for bidirectional movements of the exhaust valves and/or the intake valves.

In the second aspect of the present invention, the learn-burn NOx catalyst may be of the occlusion-reduction type or the selective reduction type.

The selective reduction type of lean-burn NOx catalyst is interpreted to mean a catalyst adapted to reduce or decompose NOx in exhaust gases emitted as a result of combustion of a fuel-lean air-fuel mixture, more specifically, to reduce or decompose NOx contained in an oxygen-rich atmosphere, in the presence of hydrocarbon. For instance, the lean-burn NOx catalyst may be a catalyst wherein zeolite carries ion-exchanged copper (Cu) or other transition metal, or zeolite or alumina carries a noble metal.

It is to be understood that the invention is applicable to a lean-burn internal combustion engine, such as diesel engines and lean-burn gasoline engines.

DETAILED DESCRIPTION OF PREFERRED EMBODIMENTS

Referring first to FIGS. 1–5, there will first be described an internal combustion engine including a variable valve control system, which engine is constructed according to the first embodiment of the invention.

Figure 1:
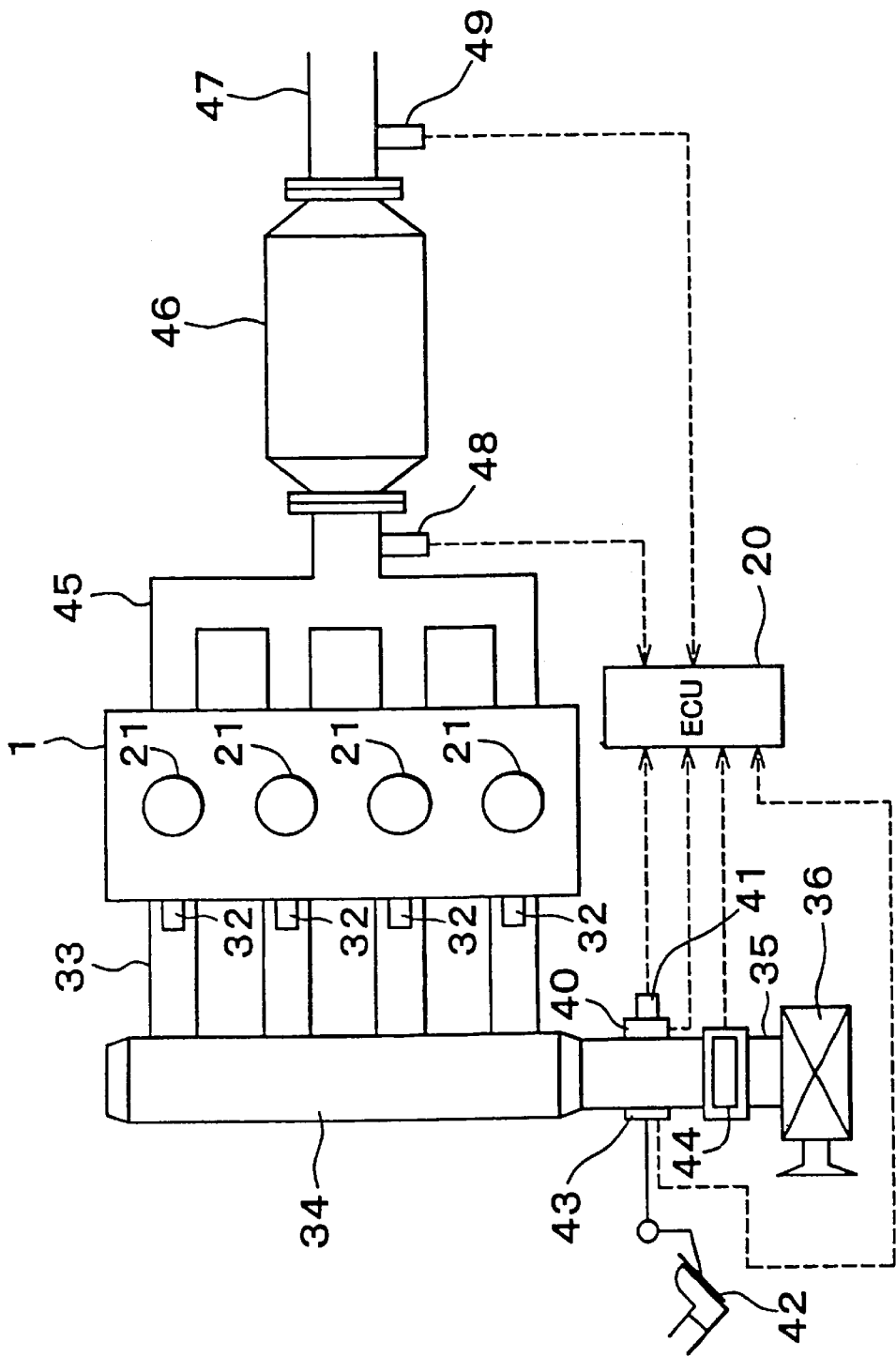
FIG. 1 a plan view schematically showing an arrangement of an internal combustion engine including a variable valve control system according to the invention.
Figure 2:
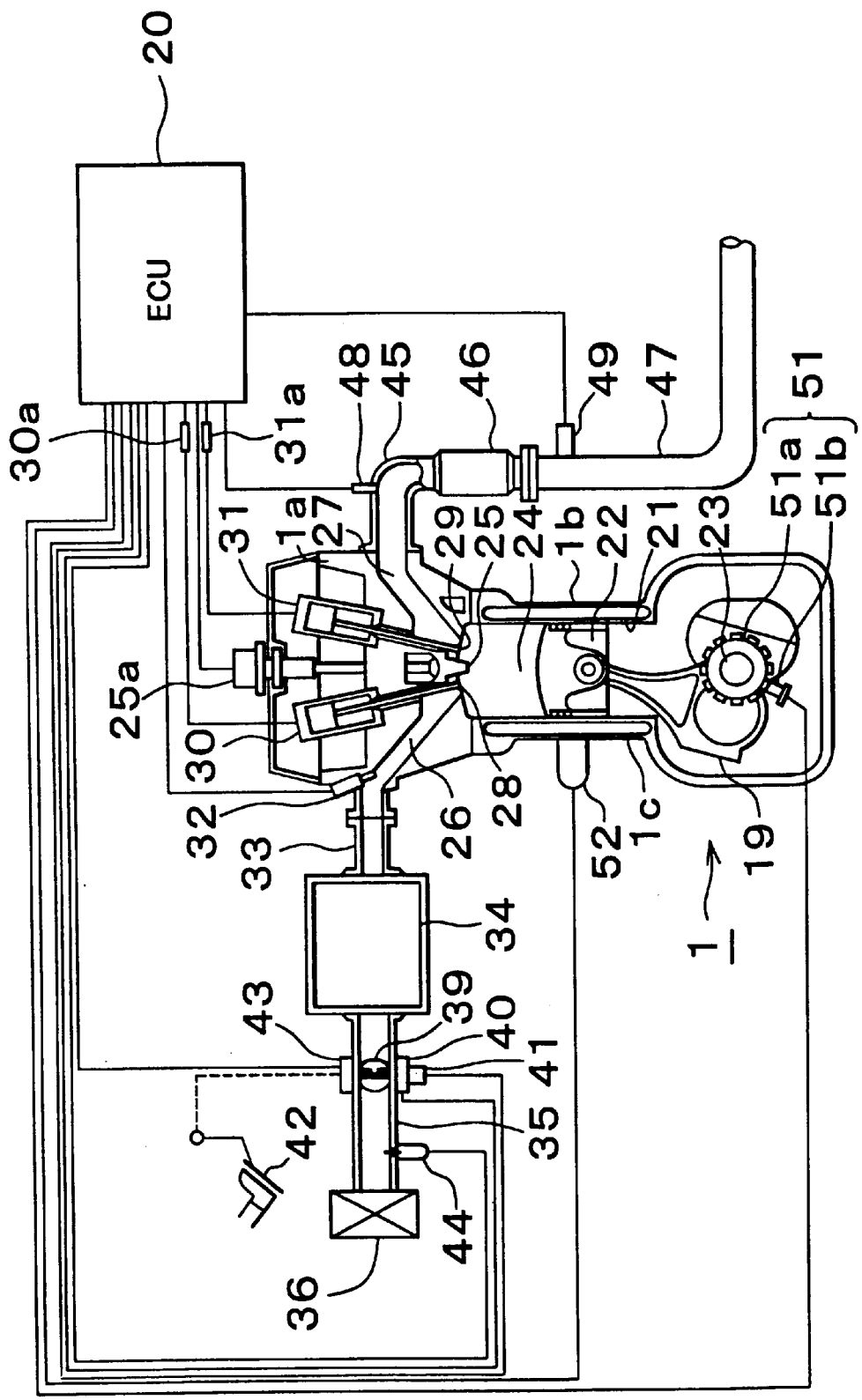
FIG. 2 is an elevational view in cross section schematically showing an arrangement of the internal combustion engine of FIG. 1.

In the schematic views of FIGS. 1 and 2, the internal combustion engine according to the first embodiment is indicated generally at 1, along with its intake and exhaust systems. The internal combustion engine 1 is a four-cycle water-cooled gasoline engine having four cylinders 21.

The internal combustion engine 1 includes a cylinder block 1b having the four cylinders 21 and cooling passages 1c, and a cylinder head 1a fixed on the cylinder block 1b.

In the cylinder block 1b, a crankshaft 23 serving as an output shaft of the engine 1 is freely rotatably supported. The crankshaft 23 is operatively connected, via a connecting rod 19, to a piston 22 which is slidably received in each cylinder 21.

An upper portion of the cylinder 21 cooperates with the upper end face of the piston 22 and the lower surface of the cylinder head 1a, to define a combustion chamber 24. The cylinder head 1a is provided with four spark plugs 25 attached thereto such that each spark plug 25 is exposed to the combustion chamber 24 in each cylinder 21. To the spark plug 25 is electrically connected an, igniter 25a for applying electric current to the spark plug 25.

The cylinder head 1a has two intake ports 26 that are open at their open ends to the combustion chamber 24 in each cylinder 21, and two exhaust ports 27 that are open at their open ends to the combustion chamber 24. The cylinder head 1a is provided with intake valves 28 for opening and closing the respective open ends of the intake ports 26, and exhaust valves 29 for opening and closing the respective open ends of the exhaust ports 27, such that the intake and exhaust valves 28, 29 are bidirectionally movable in their longitudinal direction.

The cylinder head 1a further incorporates electromagnetic drive mechanisms 30 for bidirectionally moving the respective intake valves 28. Each electromagnetic drive mechanism 30 (hereinafter referred to as "intake valve drive mechanism 30") is adapted to generate electromagnetic force when its solenoid coil is energized with electric current applied thereto, as described below in detail. To each electromagnetic drive mechanism 30 is electrically connected a driver circuit 30a (hereinafter referred to as "intake valve driver circuit 30a") for applying electric current to the corresponding solenoid.

The cylinder head 1a further incorporates electromagnetic drive mechanisms 31 for bidirectionally moving the respective exhaust valves 29. Each electromagnetic drive mechanism 31 (hereinafter referred to as "exhaust valve drive mechanism 31") is adapted to generate electromagnetic force when its solenoid coil is energized with electric current applied thereto, as described below in detail. To each electromagnetic drive mechanism 31 is electrically connected a driver circuit 31a (hereinafter referred to as "exhaust valve driver circuit 31a") for applying current to the corresponding solenoid.

The intake valve drive mechanisms 30 and the exhaust valve drive mechanisms 31 cooperate with each other to provide a variable valve control system for controlling the opening and closing timings and the lifts of the intake and exhaust valves 28, 29.

The intake valve drive mechanisms 30 and the exhaust valve drive mechanisms 31 will be described in greater detail. Since these intake and exhaust valve drive mechanisms 30 and 31 are identical in construction with each other, only the intake valve drive mechanisms 30 will be described by way of example.

Figure 3:
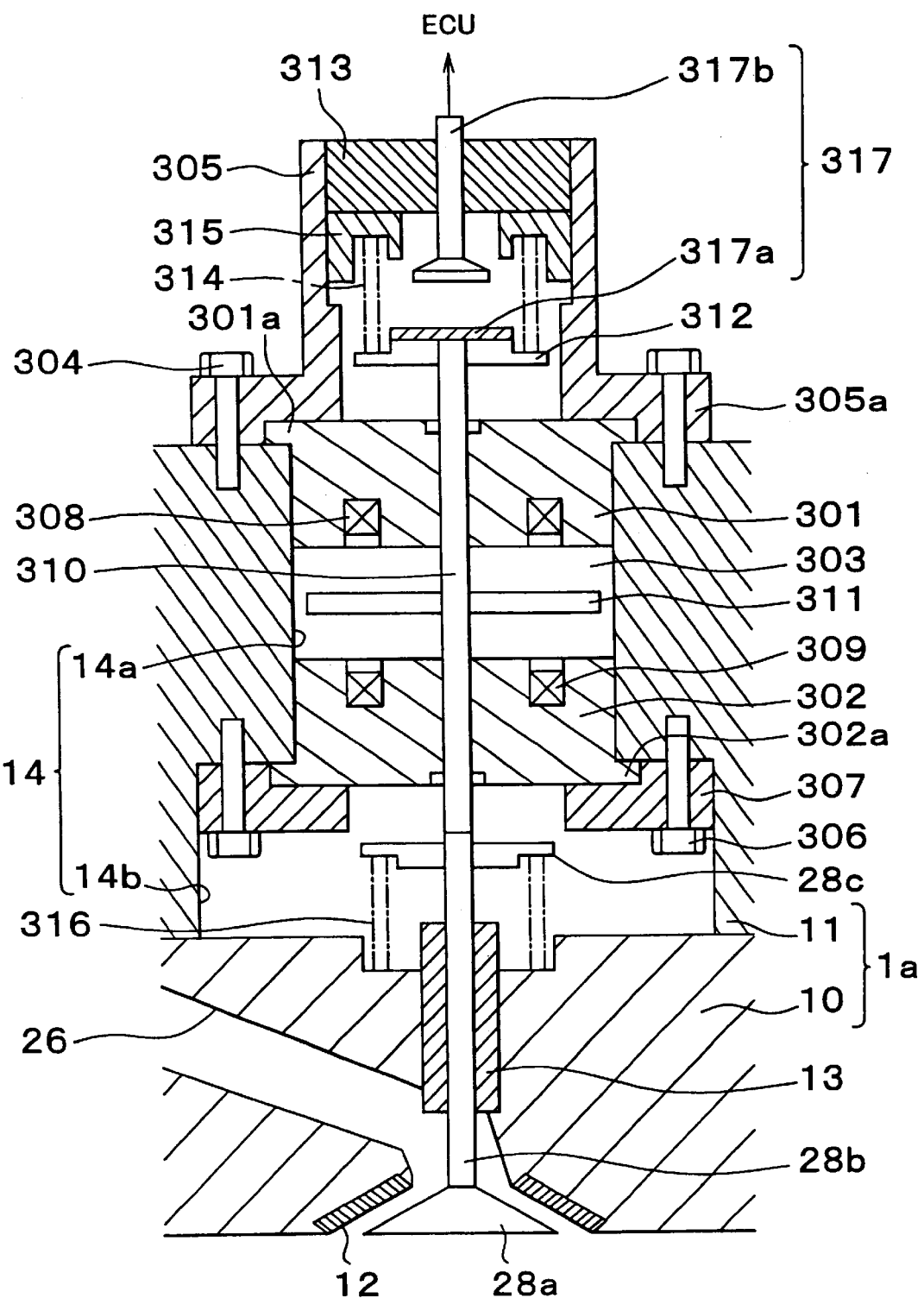
FIG. 3 is a cross-sectional view showing the interior of an electromagnetic drive mechanism for an intake valve in the engine.

Reference is now made to the cross-sectional view of FIG. 3 showing the intake valve drive mechanism 30 for one of the intake valves 28. As shown in FIG. 3, the cylinder head 1a includes a lower head 10 fixed to the upper surface of the cylinder block 1b, and an upper head 11 superposed on the lower head 10.

The lower head 10 is formed with two intake ports 26 for each cylinder 21, and each intake port 26 has a valve seat 12 at its open end exposed to the combustion chamber 24. The intake valve 28 has a valve head 28a which is movable to be seated on and unseated from the valve seat 12.

The lower head 10 further has a through-hole formed therethrough, extending from the inner wall of each intake port 26 to the upper surface of the lower head 10. The through-hole has a circular shape in cross section, and a valve guide 13 in the form of a sleeve is partially fitted in this through-hole. The intake valve 28 has a stem 28b that extends through the valve guide 13 such that the intake valve 28 is bidirectionally movable in its longitudinal direction.

The upper head 11 has a core mounting hole 14 which is concentric with the valve guide 13 and which has a circular shape in cross section. A first core 301 and a second core 302 are held in engagement with the core mounting hole 14. The core mounting hole 14 has a lower large-diameter portion 14b which has a relatively large diameter and which is located on the side of the lower head 10, and an upper small-diameter portion 14a which has a diameter smaller than that of the large-diameter portion 14b and which is located on the side remote from the lower head 10.

The first and second cores 301, 302 are annular members formed of a soft magnetic material, and are almost entirely fitted in the upper small-diameter portion 14a of the core mounting hole 14, such that the two cores 301, 302 are axially spaced apart from each other with a spacing 303 provided therebetween. The first core 301 has a flange 301a at its upper end, while the second core 302 has a flange 302a at its lower end. The first core 301 is inserted into the small-diameter hole 14a in the downward direction for abutting contact of its flange 301a with the upper surface of the upper head 11 in which the small-diameter portion 14a is open, while the second core 302 is inserted into the small-diameter hole 14a in the upward direction for abutting contact of its flange 302a with a shoulder surface formed between the small-diameter and large-diameter portions 14a, 14b. Thus, the two cores 301, 302 are positioned relative to the upper head 11, and the spacing 303 is located at a predetermined axial position within the small-diameter portion 14a.

An upper cap 305 in the form of a sleeve is disposed on the upper head 11 and the first core 301. The upper cap 305 has a flange 305a at its lower end through which screws 304 are inserted for fastening the upper cap 305 to the upper surface of the upper head 11. With the upper cap 305 thus fixed to the upper head 11, the annular lower end face of the upper cap 305 is held in abutting contact with the radially outer portion of the upper end face of the first core 301, so that the first core 301 is fixed to the upper head 11.

On the lower side of the second core 302, there is disposed an annular lower cap 307 which has substantially the same outside diameter as the diameter of the large-diameter portion 14b of the core mounting hole 14. Screws 306 are inserted through the lower cap 307 for fastening the lower cap 307 to the above-indicated shoulder surface of the hole 14, which faces in the downward direction. The lower cap 307 thus fixed to the shoulder surface is held in abutting contact with the radially outer portion of the lower end face of the second core 302, so that the second core 302 is fixed to the upper head 11.

The first core 301 has an annular groove formed in its lower surface, while the second core 302 has an annular groove formed in its upper surface. A first solenoid coil 308 and a second solenoid coil 309 are fixedly received in those annular grooves, respectively. The first and second solenoid coils 308, 309 are opposed to each other in the axial direction with the spacing 303 interposed therebetween. The two solenoid coils 308, 309 are electrically connected to the intake valve driver circuit 30a indicated above.

An annular armature 311 which has a smaller outside diameter than the diameter of the space 303 and which is formed of a soft magnetic material is disposed within the spacing 303. The annular armature 311 has a central hole through which an armature shaft 310 extends such that the armature 311 is fixed on this armature shaft 311. The armature shaft 310 has an upper portion extending through a central hole in the first core 301 such that the upper end is located within the upper cap 305, and a lower portion extending through a central hole in the second core 302 such that the lower end is located within the large-diameter portion 14b of the core mounting hole 14. Thus, the armature shaft 310 is supported by the first and second cores 301, 302 such that the armature shaft 310 is bidirectionally movable in its longitudinal direction.

An upper retainer 312 in the form of a circular disc is fixed to the upper end of the armature shaft 310 located within the upper cap 305. The upper open end of the upper cap 305 is closed by an adjusting screw plug 313 screwed therein. An upper spring 314 is provided between the upper retainer 312 and the adjusting screw plug 313 such that a spring seat 315 is interposed between the adjusting screw plug 313 and the upper spring 314. With this upper spring 314, the armature shaft 310 and the armature 311 are biased in a direction toward the large-diameter portion 14b of the core mounting hole 14, that is, in the downward direction as seen in FIGS. 2 and 3.

On the other hand, the armature shaft 310 is held, at its lower end located within the large-diameter portion 14b, in abutting contact with the upper end of the stem 28b of the intake valve 28. A lower retainer 28c in the form of a circular disc is fixed to the outer circumferential surface of the upper end portion of the stem 28b, and a lower spring 316 is disposed between the lower surface of the lower retainer 28c and the upper surface of the lower head 10. With this lower spring 316, the intake valve 28 is biased in a direction that causes the valve head 28a to be seated on the valve seat 12, that is, in the upward direction as seen in FIGS. 2 and 3. With this arrangement, the stem 28b of the intake valve 28 is held at its upper end in abutting contact with the lower end of the armature shaft 310, biasing the armature shaft 310 and the armature 311 in a direction from the large-diameter portion 14b toward the small-diameter portion 14a, that is, in the upward direction as seen in FIG. 3.

While the first and second solenoid coils 308, 309 of the intake valve drive mechanism 30 constructed as described above are not energized with electric current supplied from the intake valve driver circuit 30a, the armature shaft 310 and the intake valve 28 are held in their predetermined neutral positions of FIG. 3 with the armature shaft 310 held in abutting contact with the stem 28b, with a biasing force of the upper spring 314 acting on the armature shaft 310 in the downward direction, and with a biasing force of the lower spring 316 acting on the intake valve 28 in the upward direction.

The biasing forces of the upper spring 314 and the lower spring 316 are determined so that the armature 311 is located at an axially intermediate position of the cylindrical spacing 303, or at a position intermediate between the first and second cores 301, 302, when the armature shaft 310 is placed at its neutral position. If the neutral position of the armature 311 deviates from the above-indicated intermediate position due to initial dimensional or positional errors of the associated components or chronological changes of the positions of the components, the neutral position of the armature 311 can be re-established by rotating the adjusting screw plug 313 in the appropriate direction.

The length of the armature shaft 310 and the length of the stem 28b of the intake valve 28 are determined so that the valve head 28a of the intake valve 28 is located at a position intermediate between the fully open position and the fully closed position, namely, located at its half-open position, when the armature 311 is placed at its neutral position.

When the first solenoid coil 308 is energized with electric current supplied from the intake valve driver circuit 30a, an electromagnetic force is generated between the first coil 301 and first solenoid coil 308 and the armature 311, such that the electromagnetic force acts on the armature 311 in a direction that causes the armature 311 to be attracted toward the first core 301. When the second solenoid coil 309 is energized with electric current, an electromagnetic force is generated between the second coil 302 and second solenoid coil 309 and the armature 311, such that the electromagnetic force acts on the armature 322 in a direction that causes the armature 311 to be attracted toward the second core 302. Thus, by alternately energizing the first and second solenoid coils 308, 308 through the intake valve circuit 30a, the stem 28b of the intake valve 38 can be moved up and down with the armature 311, to move the valve head 28a between the fully closed and open positions.

The opening and closing timings of the intake valve 28 can be adjusted by suitably controlling the energization timings and the amounts of energization current of the first and second solenoid coils 308, 309.

The intake valve drive mechanism 30 is provided with a valve lift sensor 317 for detecting a displacement of the intake valve 28. The valve lift sensor 317 includes a target 317a in the form of a circular disc attached to the upper surface of the upper retainer 312, and a gap sensing member 317b attached to the adjusting screw plug 313 such that a probe at one end of the gap sensing member 371b is opposed to the target 317a.

In the thus constructed valve lift sensor 317, the target 317a is moved with the armature 311 of the intake valve driver mechanism 30, and the gap sensing member 317b generates an output signal indicative of a distance between the gap sensing member 317b and the target 317a.

Figure 4:
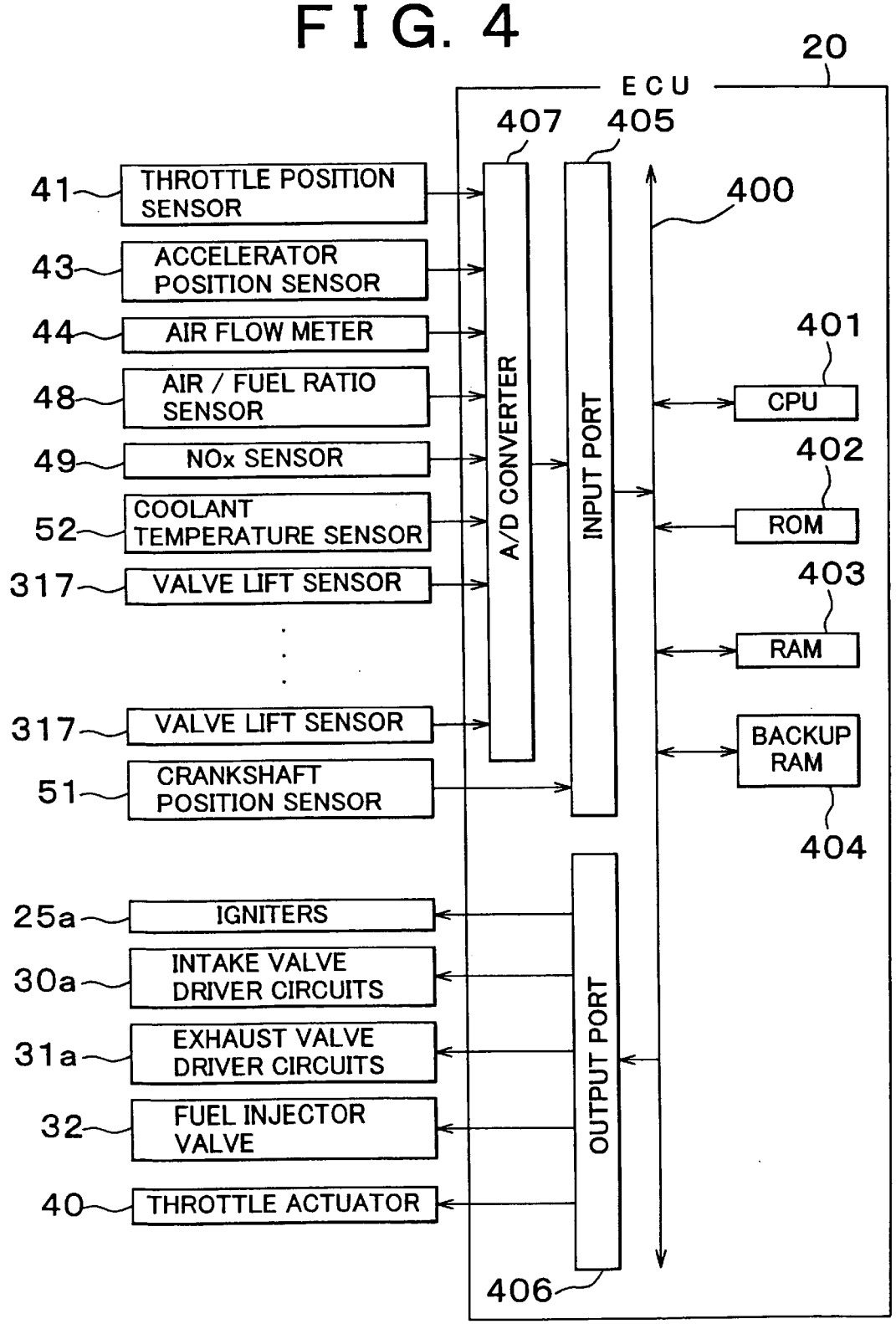
FIG. 4 is a block diagram showing an electronic control unit for controlling the engine.

As described below referring to FIG. 4, an electronic control unit (ECU) 20 is provided for controlling the internal combustion engine 1. The electronic control unit 20 includes a read-only memory (ROM) 402, which stores data indicative of the value of the output signal of the gap sensing member 317b when the armature 311 is placed in the neutral position. The amount of displacement of the armature 311 and the valve head 28a of the intake valve 28 can be calculated on the basis of a difference between the value of the output signal of the gap sensing member 317b when the armature 311 is placed in the neutral position, and the value of the output signal when the first or second solenoid coil 308, 309 is energized.

Referring back to FIGS. 1 and 2, four branch pipes of the intake manifold 33 are connected to the cylinder head 1a of the internal combustion engine 1, and each of the branch pipes of the intake manifold 33 communicates with the two intake ports 26 of each cylinder 21. Four fuel injector valves 32 are attached to the cylinder head 1a, at respective positions near the points of connection of the respective branch pipes of the intake manifold 33 to the cylinder head 1a, such that a fuel outlet of each fuel injector valve 32 is open to the intake ports 26 of the corresponding cylinder 21.

The intake manifold 33 is connected to a surge tank 34 provided to reduce pulsation of the intake air. The surge tank 34 is connected to an intake pipe 35, which in turn is connected to an air cleaner 36 provided to remove dirt and dust contained in the intake air.

The intake pipe 34 is provided with an air flow meter 44 which generates an output signal indicative of a rate of flow of the intake air through the intake pipe 35. As shown in FIG. 2, a throttle valve 39 for controlling the rate of flow of the intake air through the intake pipe 35 is disposed in a portion of the intake pipe 35 which is located downstream of the air flow meter 44.

The throttle valve 39 is provided with a throttle actuator 40, a throttle position sensor 41 and an accelerator position sensor 43. The throttle actuator 40 includes a stepping motor adapted to operate the throttle valve 39 such that the opening of the throttle valve 39 changes with the magnitude of electric power applied to the stepping motor. The throttle position sensor 41 generates an output signal indicative of the angle of opening of the throttle valve 39. The accelerator position sensor 43 is mechanically connected to an accelerator pedal 42, and generates an output signal indicative of the operating amount of the accelerator pedal 42.

Also, an exhaust manifold 45 is connected to the downstream side of the cylinder head 1a of the internal combustion engine 1. The exhaust manifold 45 includes four branch exhaust pipes each communicating with the two exhaust ports 27 of each cylinder 21.

The exhaust manifold 45 is connected to an emission purifying catalyst in the form of an NOx catalyst 46, which in turn is connected to an exhaust pipe 47 that is connected to a downstream muffler (not shown).

The NOx catalyst 46 is an occlusion-reduction type NOx catalyst having both a three-way catalytic function and an occlusion-and-reduction function. The three-way catalytic function is a function of purifying hydrocarbon (HC), carbon monoxide (CO) and nitrogen oxides (NOx) contained in exhaust gases that are emitted from the engine 1 when the emitted exhaust gases are stoichiometric or almost stoichiometric, namely, have the stoichiometric air/fuel ratio or an air/fuel ratio close to the stoichiometric value. The occlusion-and-reduction function is a function of occluding nitrogen oxides (NOx) contained in exhaust gases having a fuel-lean air/fuel ratio, and releasing the nitrogen oxides (NOx) occluded or absorbed in the NOx catalyst 46 when the emitted exhaust gases have a stoichiometric or fuel-rich air/fuel ratio. The occlusion-and-reduction function further includes a function of immediately reducing the released nitrogen oxides (NOx) into nitrogen ($N_2$) by reaction of the nitrogen oxides with unburned hydrocarbon (HC) and carbon monoxide (CO) contained in the stoichiometric or fuel-rich exhaust gases.

For instance, the occlusion-reduction type NOx catalyst 46 includes (a) a substrate formed of alumina ($Al_2O_3$), for example, and (b1) at least one element carried on the substrate and selected from alkali metals such as potassium (K), sodium (Na), lithium (Li) and cesium (Cs), alkali earth metals such as barium (Ba) and calcium (Ca), and rare earth metals such as lanthanum (La) and yttrium (Y), and (b2) at least one noble metal such as platinum (Pt) also, carried on the substrate. In this embodiment, the NOx catalyst 46 employs barium (Ba) and platinum (Pt) carried on a substrate of alumina.

When the occlusion-reduction type NOx catalyst 46 is exposed to fuel-lean exhaust gases having a relatively high oxygen concentration, oxygen ($O_2$) is deposited on the surface of platinum (Pt), in the form of $O_2^-$ or $O^{2-}$. Nitrogen oxide (NO) contained in the exhaust gases reacts with oxygen ($O_2^-$ or $O^{2-}$) on the surface of the platinum (Pt) to form nitrogen dioxides ($NO_2$). Namely, $2NO+O_2 \rightarrow 2NO_2$.

Successively, nitrogen dioxide ($NO_2$) that is being oxidized on the platinum (Pt) is bonded with barium oxide (BaO) to form nitric acid ion ($NO_3^-$), which in turn is occluded or absorbed in the occlusion-reduction type NOx catalyst 46.

This occlusion of NOx in the NOx catalyst 46 is continued while the emitted exhaust gases are kept fuel-lean, until the NOx occlusion or absorption capacity of the NOx catalyst 46 is saturated.

When the oxygen concentration of the exhaust gases to which the occlusion-reduction type NOx catalyst 46 is exposed is lowered, the amount of production of nitrogen dioxide ($NO_2$) is reduced, so that nitric acid ion ($NO_3^-$) bonded to barium oxide (Ba) is released from the NOx catalyst 46 in the form of nitrogen dioxide ($NO_2$) and nitrogen monoxide (NO).

When the exhaust gases are stoichiometric or fuel-rich, that is, when the exhaust gases contain a comparatively large amount of hydrocarbon (HC) and carbon monoxide (CO), these components (HC, CO) are oxidized by reaction with oxygen ($O_{2-}$ or $O^{2-}$) on the platinum (Pt) of the NOx catalyst 46, and nitrogen dioxide ($NO_2$) and nitrogen monoxide (NO) which have been released from the NOx catalyst 46 are reduced to nitrogen ($N_2$) by reaction with reducing agents contained in the exhaust gases, i.e., by reaction with activated components, such as hydrocarbon (HC) and carbon monoxide (CO), which have been partially oxidized by reaction with oxygen ($O_2^-$ or $O^{2-}$) on the platinum (Pt) of the NOx catalyst 46.

That is, hydrocarbon (HC) and carbon monoxide (CO) contained in the exhaust gases to which the NOx catalyst 46 is exposed are first oxidized by immediately reacting with oxygen ($O_2^-$ or $O^{2-}$) on the platinum (Pt). After the oxygen ($O_2^-$ or $O^{2-}$) on the platinum (Pt) has been consumed, the remaining amounts of hydrocarbon (HC) and carbon monoxide (CO) react with nitrogen oxides (NOx), namely, nitrogen dioxide ($NO_2$) and nitrogen monoxide (NO), so that these nitrogen oxides (NOx) are reduced into nitrogen ($N_2$).

Thus, the occlusion-reduction type NOx catalyst 46 occludes or absorbs nitrogen oxides (NOx) contained in the exhaust gases while the exhaust gases are fuel-lean, and releases and removes the occluded nitrogen oxides (NOx) while the exhaust gases are stoichiometric or fuel-rich.

The exhaust manifold 45 is provided with an air/fuel ratio sensor 48 attached thereto. This sensor 48 generates an output signal indicative of the air/fuel ratio of the exhaust gases flowing through the exhaust manifold 45, that is, the air/fuel ratio of the exhaust gases to which the occlusion-reduction type catalyst 46 is exposed.

An NOx sensor 49 is attached to a portion of the exhaust pipe 47 that is located slightly downstream of the NOx catalyst 46. The NOx sensor 49 is adapted to generate an output signal indicative of the concentration of nitrogen oxides (NOx) contained in the exhaust gases discharged from the NOx sensor 46.

The internal combustion engine 1 is further provided with a crankshaft position sensor 51 and a coolant temperature sensor 52. The crankshaft position sensor 51 includes a timing rotor 51a attached to the end of the crankshaft 23, and an electromagnetic pickup 51b fixed to a portion of the cylinder block 1b which is located near the timing rotor 51a. The coolant temperature sensor 52 is fixed to the cylinder block 1b, for detecting the temperature of a coolant flowing through coolant passages 1c formed through the engine 1.

As indicated above, the operation of the internal combustion engine 1 is controlled by the electronic control unit 20 (hereinafter abbreviated to "ECU 20"). To the ECU 20, there are connected through electric wires various sensors such as the above-indicated throttle position sensor 41, accelerator position sensor 43, air flow meter 44, air/fuel ratio sensor 48, NOx sensor 49, crankshaft position sensor 51, coolant temperature sensor 52 and valve lift sensors 317. Namely, the ECU 20 receives the output signals of those sensors.

To the ECU 20 are also connected through electric wires the above-indicated igniters 25a, intake valve driver circuits 30a, exhaust valve driver circuits 31a, fuel injector valves 32 and throttle actuator 40, so that the ECU 20 can control these components 25a, 30a, 31a, 32, 40 according to the output signals of the above-indicated sensors.

The ECU 20 includes a bidirectional bus 400, and a central processing unit (CPU) 401, the above-indicated read-only memory (ROM) 402, a random-access memory (RAM) 403, a backup random-access memory (backup RAM) 404, an input port 405 and an output port 406, which are interconnected to each other through the bidirectional bus 400. The ECU 20 further includes an analog/digital converter (A/D converter) 407 connected to the input port 405.

To the AD converter 407, there are connected through electric wires the sensors adapted to generate analog output signals, such as the throttle position sensor 41, accelerator position sensor 43, air flow meter 44, air/fuel ratio sensor 48, NOx sensor 49, coolant temperature sensor 52 and valve lift sensors 317. The A/D converter 407 converts the analog output signals of the above-indicated sensors into digital signals to be fed to the input port 405.

To the input port 405, there are connected through the A/D converter 407 the sensors adapted to generate the analog output signals, such as the throttle position sensor 41, accelerator position sensor 43, air flow meter 44, air/fuel ratio sensor 48, NOx sensor 49, coolant temperature sensor 52 and valve lift sensors 317. However, the sensors adapted to generate digital output signals, such as the above-indicated crankshaft position sensor 51, are directly connected to the input port 405.

The digital output signals received by the input port 405 through the A/D converter 407 or directly from the crankshaft position sensor 51 are fed to the CPU 401 and RAM 403 through the bidirectional bus 400.

The igniters 25a, intake valve driver circuits 30a, exhaust valve driver circuits 31a, fuel injector valves 32 and throttle actuator 40 are connected to the output port 406 through electric wires. The output port 406 receives control signals from the CPU 401 through the bidirectional bus 400, and applies these control signals to the igniters 25a, intake valve driver circuits 30a, exhaust valve driver circuits 31a, fuel injector valves 32 and throttle actuator 40.

The ROM 402 stores various application programs such as programs for executing a fuel injection amount control routine for determining the amount of fuel injection into the cylinders. 21, a fuel injection timing control routine for determining the timings of fuel injection into the cylinders 21, an intake valve timing control routine for determining the opening and closing timings of the intake valves 28, and an exhaust valve timing control routine for determining the opening and closing timings of the exhaust valves 29. The ROM 402 also stores programs for executing an intake valve drive current control routine for determining the amounts of electric current to be applied from the intake valve driver circuits 30a to the solenoid coils 308, 309 of the electromagnetic intake valve drive mechanisms 30, an exhaust valve driver current control routine for determining the amounts of electric current to be applied from the exhaust valve driver circuits 31a to the solenoid coils of the electromagnetic exhaust valve drive mechanism 31, an ignition timing control routine for determining the ignition timings of the igniters 25a for the cylinders 21, and a throttle valve opening control routine for determining the opening of the throttle valve 39. The ROM 402 further stores a control program for executing a purification assisting control routine for reducing or removing nitrogen oxides (NOx) occluded or absorbed in the occlusion-reduction type NOx catalyst 46.

The ROM 402 further stores various data maps, in addition to the application programs described above. The stored data maps include: a fuel injection amount control data map representative of a predetermined relationship between the operating state of the internal combustion engine 1 and the amount of fuel injection; a fuel injection timing control data map representative of a predetermined relationship between the operating state of the engine 1 and the timing of fuel injection; an intake valve timing control data map representative of a predetermined relationship between the operating state of the engine 1 and the opening and closing timings of the intake valves 28; an exhaust valve timing control data map representative of a predetermined relationship between the operating state of the engine 1 and the opening and closing timings of the exhaust valves 29; a valve drive current control data map representative of predetermined relationships between the operating state of the engine 1 and the amounts of electric current to be applied to the electromagnetic intake and exhaust valve drive mechanisms 30, 31; an ignition timing control data map representative of a predetermined relationship between the operating state of the engine 1 and the ignition timing of each spark plug 25; and a throttle valve opening control data map representative of a predetermined relationship between the operating state of the engine 1 and the opening of the throttle valve 39.

The RAM 403 is provided to temporarily store the output signals of the various sensors, and results of arithmetic operations performed by the CPU 401, such as the engine speed as calculated on the basis of the output signal of the crankshaft position sensor 51. The signals and data stored in the RAM 403 are updated each time the ECU 20 receives the output signal of the crankshaft position sensor 51.

The backup RAM 404 is a non-volatile memory which retains data even after the operation of the engine 1 is stopped. The backup RAM 404 stores various data, such as values obtained by learning, which are associated with various control operations.

The CPU 401 operates according to the application programs stored in the ROM 402, to execute the various control routines such as the fuel injection control routine, ignition timing control routine, intake valve timing control routine, exhaust valve timing control routine, throttle valve opening control routine, and purification assisting control routine.

In executing the various control routines, the CPU 401 monitors the operating state of the internal combustion engine 1, on the basis of the output signals of the crankshaft position sensor 51, accelerator positions sensor 43, and air flow meter 44. Depending upon the monitored operating state of the engine 1, the CPU 401 executes the appropriate control routine or routines.

When the CPU 401 determines that the engine 1 is operating with a relatively low or medium load, the CPU 401 controls the engine 1 so as to be operated with an oxygen-rich air-fuel mixture having a fuel-lean air/fuel ratio, by controlling the opening of the throttle valve 39, the amount of fuel to be injected from the fuel injector valves 32, the opening and closing timings of the intake valves 28, the opening and closing timings of the exhaust valves 29 and the ignition timings of the spark plugs 25.

When the CPU 401 determines that the engine 1 is operating with a relatively high load, the CPU 401 controls the engine 1 so as to be operated with an air-fuel mixture having the stoichiometric ratio, by controlling the throttle opening, fuel injection amount, opening and closing timings of the intake and exhaust valves 28, 29 and ignition timing.

When the engine 1 is operating with a fuel-lean air-fuel mixture, the exhaust gases emitted from the engine 1 are also fuel-lean, so that the nitrogen oxides (NOx) contained in the emitted exhaust gases are occluded or absorbed into the NOx catalyst 46. The NOx occlusion capacity of the NOx catalyst 46 is saturated after a given period of lean-burn operation of the engine 1 with the fuel-lean air-fuel mixture. After the saturation of the NOx occlusion capacity of the NOx catalyst 46, there is a risk that the nitrogen oxides (NOx) are released into the atmosphere with the exhaust gases, without being removed or reduced or otherwise converted.

To avoid the above risk, the CPU 401 initiates the purification assisting control routine when the NOx occlusion capacity of the NOx catalyst 46 is saturated during the lean-burn operation of the engine 1. In the purification assisting control routine, the engine 1 is controlled so that the exhaust gases emitted from the engine 1 are controlled to be temporarily fuel-rich to reduce and remove the nitrogen oxides (NOx) which have been occluded or absorbed in the NOx catalyst 46, in order to recover the NOx catalyst 46 into a state suitable for purifying the exhaust gases.

The purification assisting control according to the present embodiment will be now described. The purification assisting control is performed according to the purification assisting control routine executed by the CPU 401 as illustrated in the flowchart of FIG. 5.

The purification assisting control routine is executed according to the control program stored in the ROM 402, repeatedly with a predetermined cycle time, for instance, each time the CPU 401 receives an output pulse signal from the crankshaft position sensor 51.

Figure 5:
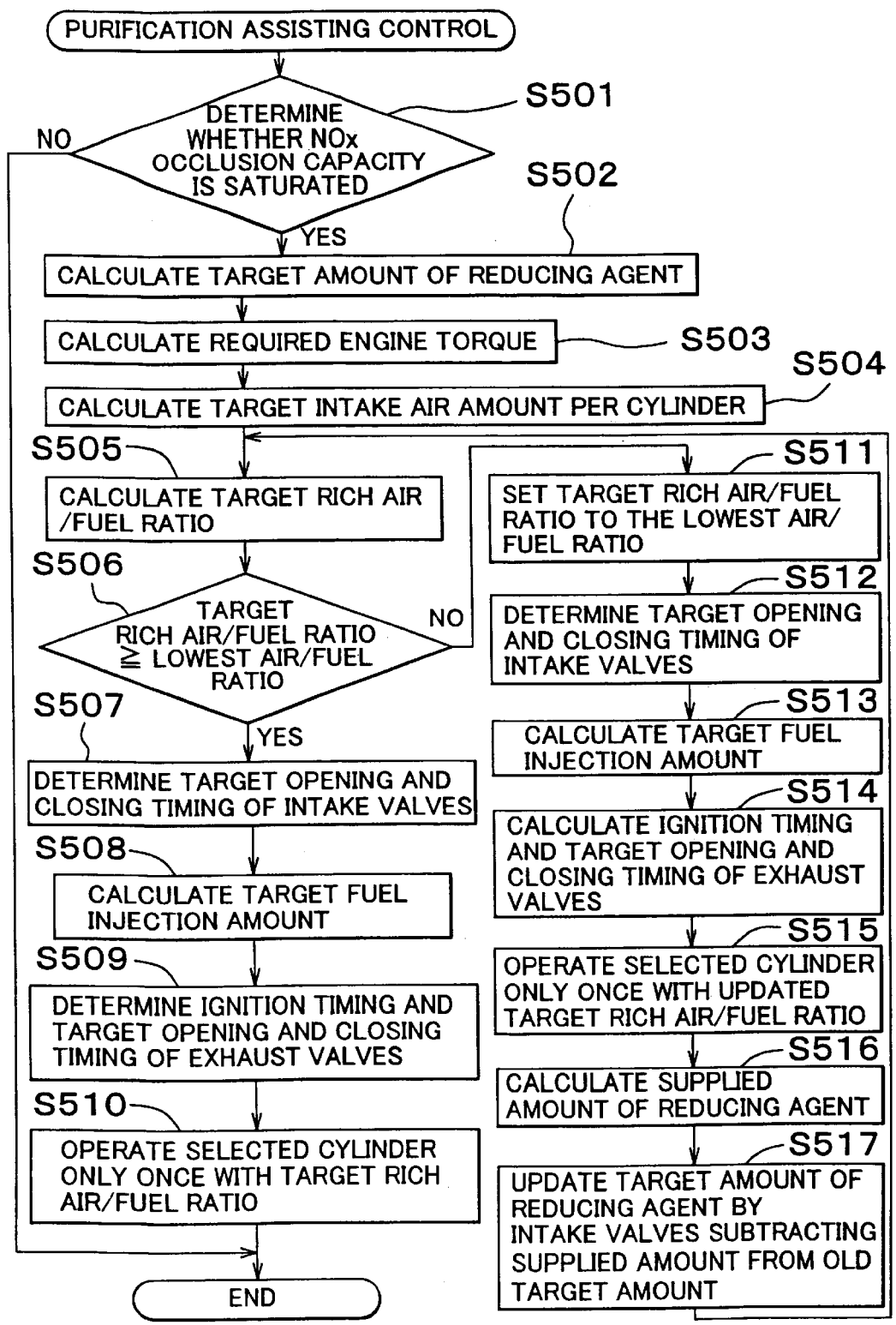
FIG. 5 is a flowchart illustrating a purification assisting control routine according to a first embodiment of the invention.

The purification assisting control routine of FIG. 5 is initiated with step S501 to determine whether the NOx occlusion capacity of the occlusion-reduction type NOx catalyst 46 is saturated.

For example, the determination in step S501 as to whether the NOx occlusion capacity of the NOx catalyst 46 is saturated is effected by first estimating the amount of NOx absorbed and presently stored in the NOx catalyst, on the basis of the operating hysteresis of the internal combustion engine 1, namely, a difference between the cumulative time of the lean-burn operation with a fuel-lean air-fuel mixture and that of the operation with an air-fuel mixture having the stoichiometric air/fuel ratio, and then comparing the thus estimated amount of the stored NOx with the maximum amount of NOx that can be stored in the NOx catalyst 46. Alternatively, the determination in step S501 can be made by first estimating the amount of the stored NOx on the basis of a temperature of the substrate of the NOx catalyst 46 or on the basis of the output signal of the air/fuel ratio sensor 48, and then comparing the thus estimated amount of the occluded NOx with the maximum amount of NOx that can be stored in the NOx catalyst 46. Further alternatively, the determination in step S501 can be made on the basis of the output signal of the NOx sensor 49 while the exhaust gases to which the NOx catalyst 46 is exposed have a predetermined air/fuel ratio.

Hereinafter, the maximum amount of NOx that can be absorbed and stored in the NOx catalyst 46 will be referred to simply as "maximum NOx occlusion amount" of the NOx catalyst 46.

If the CPU 401 determines in step S501 that the NOx occlusion capacity of the NOx catalyst 46 is not saturated, one cycle of execution of the present purification assisting control routine is terminated. If the CPU 401 determines in step S501 that the NOx occlusion capacity of the NOx catalyst 46 is saturated, the control flow proceeds to step S502.

In step S502, the CPU 401 calculates an amount of reducing agents required to reduce and remove the entire amount of NOx presently stored in the NOx catalyst 46, in other words, the maximum NOx occlusion amount of the NOx catalyst 46. This amount of reducing agents will be referred to as "target amount of reducing agents".

It is noted that since the maximum NOx occlusion amount of the NOx catalyst 46 can be determined by experimentation, the target amount of reducing agents can also be determined by experimentation and can therefore be stored in the ROM 402.

The control flow then proceeds to step S503 in which the CPU 401 reads from the RAM 403 the engine speed and the operating amount of the accelerator pedal 42 represented by the output signal of the accelerator position sensor 43, and calculates the presently required output torque of the engine 1 on the basis of the operating amount of the accelerator pedal 42 and the engine speed.

Step S503 is followed by step S504 in which the CPU 401 calculates the maximum amount of air that can be drawn into each cylinder 21 (hereinafter referred to as "target intake air amount per cylinder") for the engine 1 to produce the required output torque calculated in step S503.

It is possible to obtain by experimentation a relationship between the output torque of the engine 1 and the intake air amount per cylinder when the engine 1 is operated with a fuel-rich air-fuel mixture having a predetermined air/fuel ratio (for instance, the lowest air/fuel ratio at which the air-fuel mixture is combustible). This relationship may be stored in advance in the form of a map. The target intake air amount per cylinder can be calculated on the basis of the calculated required output torque of the engine 1 and according to the map indicated above.

Then, the control flow proceeds to step S505 in which the CPU 401 calculates a target air/fuel ratio of a fuel-rich air-fuel mixture to be burned in a selected single cylinder 21 of the engine 1, which fuel-rich air-fuel mixture permits the required amount of reducing agents calculated in step S502 to be contained in the exhaust gases emitted from that cylinder 21. This calculation of the target air/fuel ratio of the fuel-rich air-fuel mixture is effected on the basis of the required amount of reducing agents and the required intake air amount per cylinder calculated in step S504.

Step S505 is followed by step S506 in which the CPU 401 compares the target air/fuel ratio of the fuel-rich air-fuel mixture calculated in step S505 with the lowest air/fuel ratio (the most fuel-rich air/fuel ratio) in a range of air/fuel ratio within which the air-fuel mixture is combustible in the cylinder 21.

If the CPU 401 determines in step S506 that the calculated target air/fuel ratio is equal to or higher than the lowest air/fuel ratio, the CPU 401 determines that it is possible to supply the NOx catalyst 46 with the target amount of reducing agents, by operating the selected single cylinder only once with the fuel-rich air-fuel mixture having the above-indicated target air/fuel ratio. In this case, the control flow proceeds to step S507.

In step S507, the CPU 401 selects one of the cylinders 21, and determines target opening and closing timings of the intake valves 28 of the selected cylinder 21 so that the amount of intake air to be introduced into the selected cylinder 21 coincides with the target intake air amount per cylinder calculated in step S504.

Then, the control flow proceeds to step S508 in which the CPU 401 calculates a target amount of fuel injection by dividing the target intake air amount per cylinder by the target air/fuel ratio.

Step S508 is followed by step S509 in which the CPU 401 determines the target ignition timing of the selected cylinder 21 and target opening and closing timings of the exhaust valves 29 of that cylinder 21 so that the actual output torque of the engine 1 coincides with the required output torque of the engine 1 calculated in step S503 when the cylinder 21 in question is operated with the above-indicated target intake air amount per cylinder and the fuel-rich air/fuel mixture having the target air/fuel ratio.

The control flow then proceeds to step S510 in which the CPU 401 controls the intake valve driver circuit 30a, fuel injector valve 32, exhaust valve driver circuit 31a and igniter 25a of the selected cylinder 21, according to the target opening and closing timings of the intake valves 28 and exhaust valves 29, target amount of fuel injection and target ignition timing, which have been calculated in steps S507–S509.

Since the valve heads 28a of the intake valves 28 of each cylinder 21 are disposed so as to partially define the combustion chamber 24 when the intake valves 28 are closed, so that changing the opening and closing timings of the intake valves 28 will immediately cause a change in the actual intake air amount, without a significant control delay. By controlling the intake valve driver circuit 30a so that the actual opening and closing timings of the intake valves 28 of the selected cylinder 21 coincide with the desired timings, the actual intake air amount that is drawn into the cylinder 21 is immediately controlled to the required intake air amount per cylinder.

Accordingly, the selected cylinder 21 can be immediately operated with the fuel-rich air-fuel mixture having the target air/fuel ratio, by controlling the intake valves 28 and the fuel injector valve 32 according to the target intake valve opening and closing timings and the target amount of fuel injection. As a result, the exhaust gases emitted from the selected cylinder 21 in the exhaust stroke contain an amount of reducing agents substantially equal to the target amount calculated in step S502.

The exhaust gases emitted from the selected cylinder 21 enter the NOx catalyst 46 through the exhaust manifold 45, so that the nitrogen oxides (NOx) absorbed in the NOx catalyst 46 are entirely reduced and removed with the reducing agents contained in the exhaust gases.

Thus, the entire amount of nitrogen oxides (NOx) absorbed in the NOx catalyst 46 is reduced and removed by only one rich-burn operation of only one of the cylinders 21 of the engine 1 with the fuel-rich air-fuel mixture having the target air/fuel ratio.

If it is determined in step S506 that the target air/fuel ratio calculated in step S505 is lower than the lowest air/fuel ratio, the CPU 401 determines that only one rich-burn operation of only one cylinder 21 does not make it possible to supply the NOx catalyst 46 with the exhaust gases containing the required amount of reducing agents. In this case, the control flow proceeds to step S511.

In step S511, the CPU 401 determines the lowest air/fuel ratio as an updated target air/fuel ratio of the air-fuel mixture.

Step S511 is followed by step S512 in which the CPU 401 selects one of the cylinders 21 of the engine 1, and determines the target opening and closing timings of the intake valves 28 of the selected cylinder 21 so that the actual intake air amount coincides with the target intake air amount per cylinder calculated in step S504.

Then, the control flow proceeds to step S513 in which the CPU 401 calculates the target amount of fuel injection by dividing the target intake air amount per cylinder calculated in step S504 by the updated target air/fuel ratio calculated in step S511.

Step S513 is followed by step S514 in which the CPU 401 determines the target ignition timing of the selected cylinder 21 and the target opening and closing timings of the exhaust valves 29 of the cylinder 21 so that the actual output torque of the engine 1 coincides with the required output torque when the selected cylinder 21 is operated with the target intake air amount per cylinder and the fuel-rich air-fuel mixture having the target air/fuel ratio.

In the next step S515, the CPU 401 controls the intake valve driver circuit 30a, fuel injector valve 32, exhaust valve driver circuit 31a and igniter 25a of the selected cylinder 21, according to the target opening and closing timings of the intake and exhaust valves 28, 29, target amount of fuel injection and target ignition timing.

The control flow then proceeds to step S516 in which the CPU 401 calculates the amount of the reducing agents contained in the exhaust gases which have been emitted from the selected cylinder 21 to the NOx catalyst 46, as a result of the rich-burn operation of the selected cylinder 21 with the target intake air amount and the updated target air/fuel ratio of the air-fuel mixture. The calculated amount of reducing agents will be referred to as "supplied amount of reducing agents".

Step S516 is followed by step S517 in which the CPU 401 calculates an updated target amount of reducing agents, by subtracting the supplied amount of reducing agents from the target amount of reducing agents initially calculated in step S502. Then, the control flow returns to step S505 and repeats the subsequent steps, with the originally determined target amount of reducing agents being replaced by the updated target amount obtained in step S517.

When steps S505 and subsequent steps are implemented after steps S511–S517 have been implemented, two or more cylinders 21 are operated with a fuel-rich air-fuel mixture (having an air/fuel ratio smaller than the stoichiometric value), and the total actual amount of reducing agents contained in the exhaust gases emitted from these cylinders 21 is made equal to the target amount of reducing agents, i.e., the amount required to reduce the entire amount of nitrogen oxides (NOx) stored in the NOx catalyst 46. As a result, the nitrogen oxides (NOx) which have been occluded or absorbed in the NOx catalyst 46 can be reduced and removed during the rich-burn operations of the selected two or more cylinders 21. However, the selected same cylinder 21 may be operated with a fuel-rich air-fuel mixture. For instance, the selected cylinder 21 is first rich-burn operated in step S515, and then again rich-burn operated in step S510, so that the total actual amount of reducing agents contained in the exhaust gases emitted from this cylinder 21 is made equal to the target amount of reducing agents.

The internal combustion engine 1 as described above utilizes the electromagnetic intake valve drive mechanisms 30 for controlling the opening and closing timings of the intake valves 28 for the respective cylinders 21 of the engine 1, such that the amounts of intake air to be drawn into the respective cylinders 21 can be controlled independently of each other. When the nitrogen oxides (NOx) occluded or absorbed in the occlusion-reduction type NOx catalyst 46 are to be reduced and removed, the purification assisting control as described above is implemented to operate the required minimum number of cylinder(s) 21 with a fuel-rich air-fuel mixture by changing the amount of intake air into the rich-burn operated cylinder(s) 21, so that the NOx catalyst 46 is supplied with exhaust gases containing the desired or target amount of reducing agents.

The amount of intake air to be drawn into each cylinder 21 that is operated with a fuel-rich air-fuel mixture can be controlled to a desired value without a control delay, by controlling the opening and closing timings of the corresponding intake valves 28, so that the air/fuel ratio of the fuel-rich air-fuel mixture can be almost instantly controlled to the desired value.

Accordingly, the exhaust gases to which the NOx catalyst 46 is exposed during the purification assisting control can be controlled to supply the NOx catalyst 46 in a short time with the reducing agents necessary to reduce and remove the nitrogen oxides (NOx) present in the NOx catalyst 46. Thus, the required length of rich-burn operation of the cylinder or cylinders 21 with a fuel-rich air-fuel mixture can be minimized. Accordingly, the rich-burn operation of the engine 1 does not result in significant deterioration of the vehicle driveability and the fuel economy of the engine 1.

Further, the present purification assisting control is adapted to determine the target intake air amount and the target amount of fuel injection for the selected cylinder 21 such that the output torque produced by the selected cylinder 21 is equal to that produced by the other cylinders 21 (which are operated with a fuel-lean air-fuel mixture). Accordingly, the output torque of the engine 1 as a whole does not vary when the selected cylinder 21 is rich-burn operated at the target air-fuel ratio while the other cylinders 21 are lean-burn operated as in the normal operation of the engine 1.

Although the present embodiment is arranged to determine the target intake air amount per cylinder such that the output torque of the selected cylinder 21 is equal to that of the other cylinders 21, as described above, the target intake air amount per cylinder may be determined to be equal to the maximum intake air amount that can be drawn into each cylinder 21 during one intake stroke.

When the maximum intake air amount is used as the target intake air amount per cylinder, the amount of exhaust gases that are emitted from each cylinder 21 in one exhaust stroke is accordingly increased, whereby the amount of reducing agents contained in the exhaust gases emitted from each cylinder in one exhaust stroke is accordingly increased. In this case, therefore, it is possible to further reduce the required time of the rich-burn operation of at least one cylinder 21 to reduce and remove the nitrogen oxides occluded in the NOx catalyst 46.

When the maximum intake air amount is used as the target intake air amount per cylinder, however, the output torque produced by the selected cylinder 21 is supposed to be considerably larger than that produced by the other cylinders 21. In this sense, it is desirable to restrict the output torque of the selected cylinder 21, by either controlling the opening and closing timings of the exhaust valves 29 and/or the ignition timing of the selected cylinder 21, or the opening and closing timings of the exhaust valves 29 of the cylinder 21 which is in the exhaust stroke when the selected cylinder 21 is in the expansion stroke.

Figure 6:
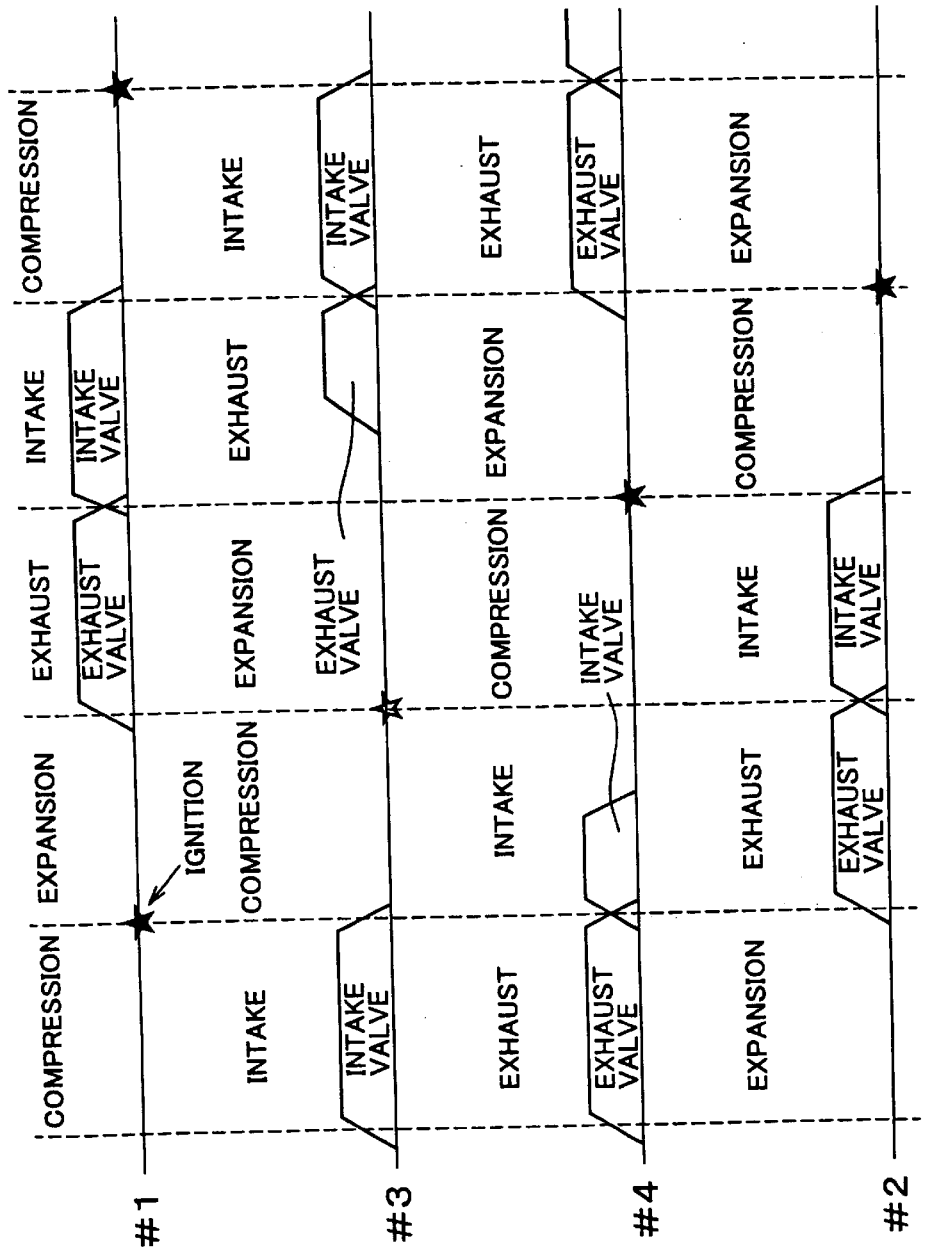
FIG. 6 is a timing chart indicating the opening and closing timing of intake and exhaust valves in one example of purification assisting control according to a second embodiment of this invention.
Figure 7:
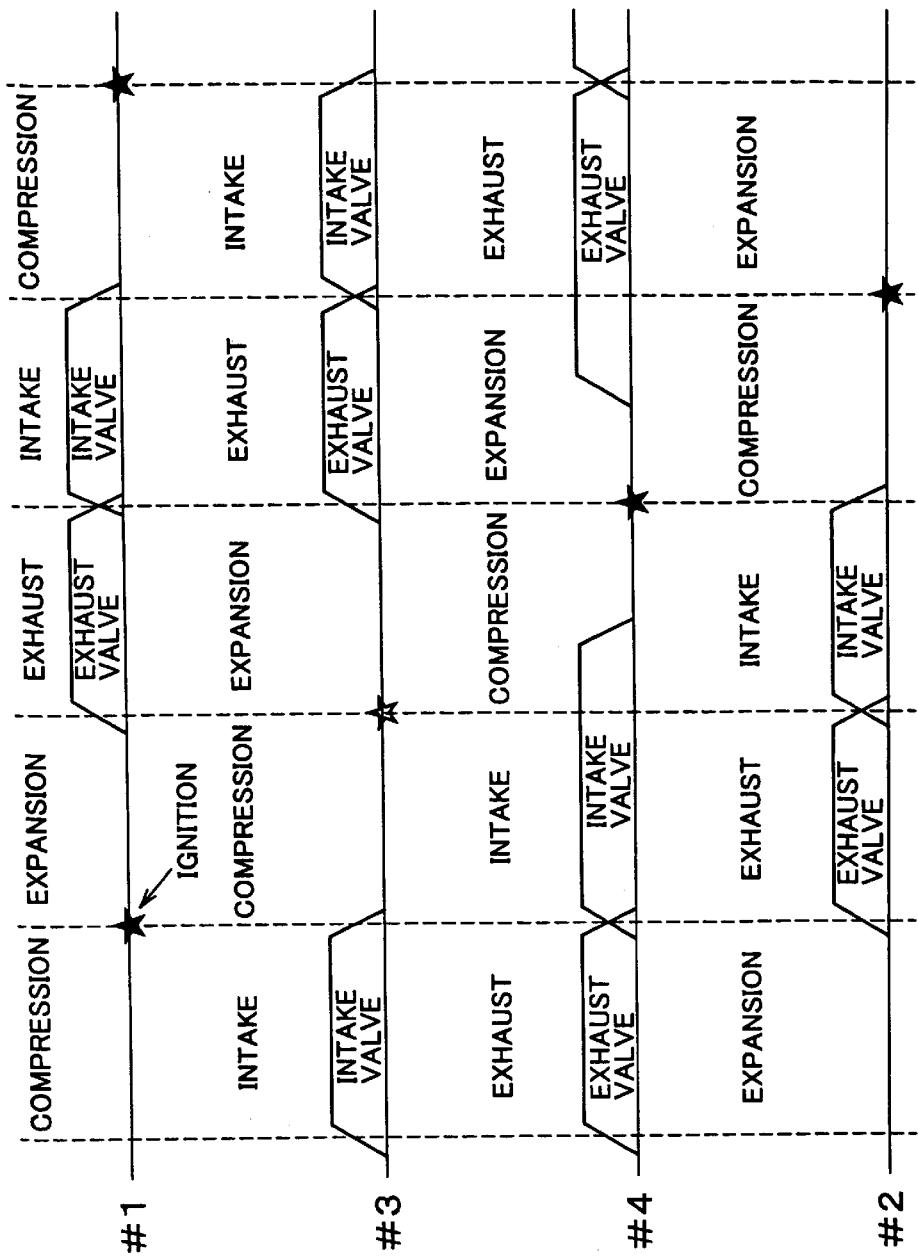
FIG. 7 is a timing chart indicating the opening and closing timing of the intake and exhaust valves in another example of the purification assisting control according to the second embodiment.
Figure 8:
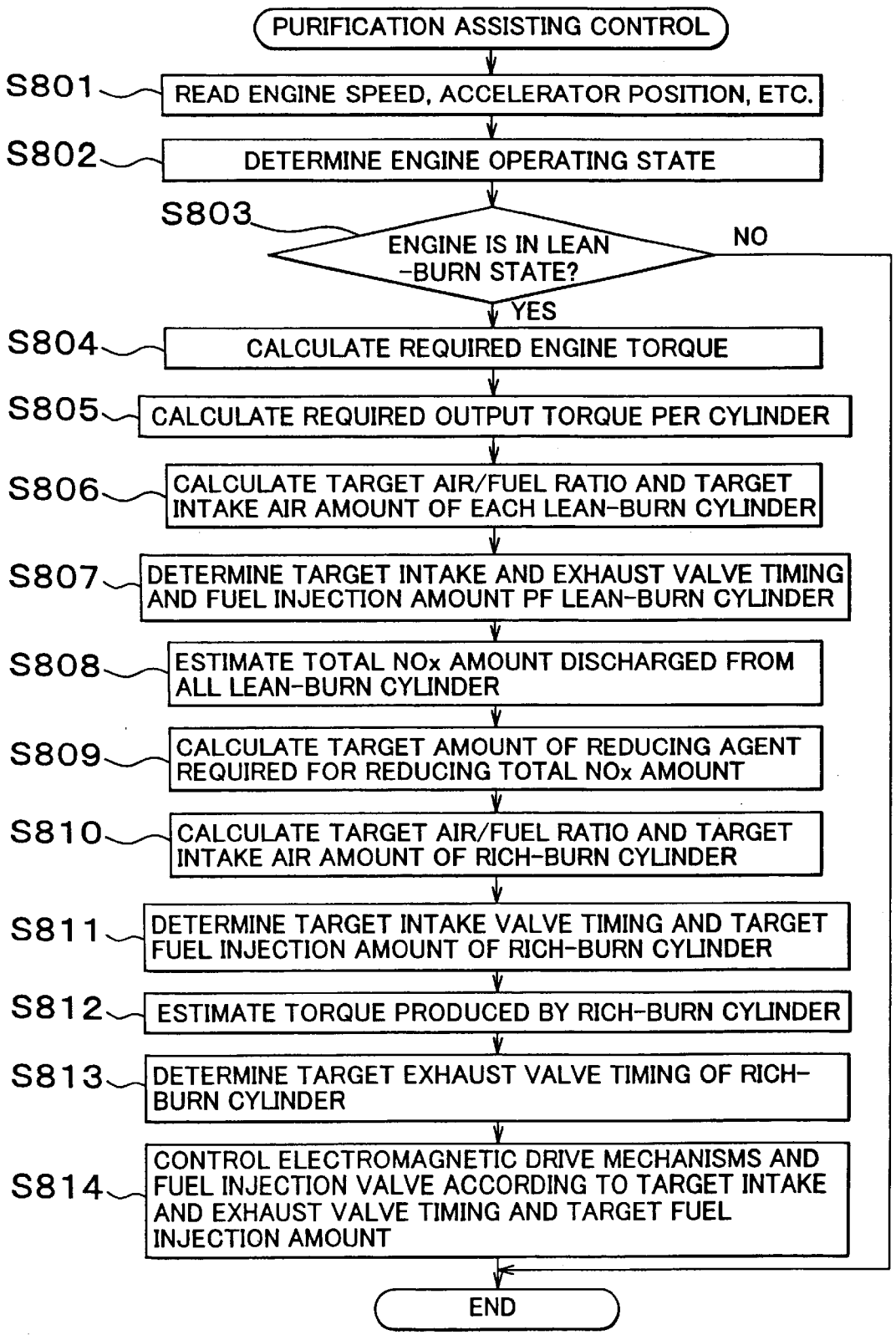
FIG. 8 is a flowchart illustrating a purification assisting control routine executed to effect the purification assisting control of FIG. 7.

Referring next to FIGS. 6–8, there will be described a second embodiment of this invention as applied to the internal combustion engine 1 of FIG. 1 provided with the variable valve drive mechanisms 30, 31. The second embodiment is different from the first embodiment, only in the purification assisting control performed by the ECU 20.

The first embodiment of FIGS. 1–5 is arranged to initiate a rich-burn operation of at least one cylinder 21 with a fuel-rich air-fuel mixture when the NOx occlusion capacity of the NOx catalyst 46 is saturated during the normal operation of the cylinders 21 of the engine 1 with a fuel-lean air-fuel mixture, so that the exhaust gases emitted from the rich-burn operated cylinder 21 are temporarily made fuel-rich and contain reducing agents necessary to reduce and remove the nitrogen oxides (NOx) occluded in the NOx catalyst 46. On the other hand, the second embodiment is arranged to always effect rich-burn operation of at least one of the cylinders 21 while the other cylinders 21 are lean-burn operated.

In the following specific examples of the second embodiment, only one cylinder 21 is rich-burn operated while the other three cylinders 21 are lean-burn operated. Described more precisely, the three cylinders 21 are successively operated with a fuel-lean air-fuel mixture, and then the remaining one cylinder 21 is operated with a fuel-rich air-fuel mixture, so that fuel-lean exhaust gases are successively emitted from the lean-burn operated cylinders 21, and then fuel-rich exhaust gases are emitted from the rich-burn operated cylinder 21.

Accordingly, the occlusion-reduction type NOx catalyst 46 occludes or absorbs nitrogen oxides (NOx) contained in the exhaust gases emitted from the lean-burn operated cylinders 21, and the occluded nitrogen oxides are reduced and released by reducing agents contained in the exhaust gases emitted from the rich-burn operated cylinder 21. In this manner, the occlusion and reduction of the nitrogen oxides are repeated during the operation of the engine 1.

In the rich-burn operation of the selected cylinder 21, the air/fuel ratio and the amount of the fuel-rich exhaust gases emitted from the rich-burn operated cylinder 21 in each exhaust stroke are optimized to reduce and remove the entire amount of the nitrogen oxides (NOx) occluded in the NOx catalyst 46 during the lean-burn operations of the three cylinders 21, namely, the entire amount of the nitrogen oxides contained in the exhaust gases emitted from the three lean-burn operated cylinders 21.

It is noted that the combustion pressure generated upon combustion of a fuel-rich air-fuel mixture in the rich-burn operated cylinder 21 is higher than that upon combustion of a fuel-lean air-fuel mixture in the lean-burn operated cylinders 21. If the combustion pressure as generated in the rich-burn operated cylinder 21 acted on the crankshaft 23 to produce a torque, the engine 1 would suffer from an undesirable variation in the output torque when the combustion occur successively in the four cylinders 21.

In view of the above situation, the CPU 401 of the ECU 20 operated according to this second embodiment controls the opening and closing timings of the exhaust valves 29 of the cylinder 21 which is in the exhaust stroke when the rich-burn operated cylinder 21 is in the expansion stroke. Alternatively, the CPU 401 controls the opening and closing timings of the exhaust valves 29 of the rich-burn operated cylinder 21. With this control performed, the output torque of the rich-burn operated cylinder 21 is reduced to be substantially equal to that of the lean-burn operated cylinders 21.

In the example of FIG. 6, the #4 cylinder 21 is selected as the rich-burn operated cylinder 21, and the #1, #2 and #3 cylinders 21 are lean-burn operated. The CPU 401 controls the exhaust valve drive mechanism 31 of the #3 cylinder 21 which is in the exhaust stroke when the #4 cylinder 21 is in the expansion stroke, such that the exhaust valves 29 of the #3 cylinder are opened after the moment of initiation of the exhaust stroke, that is, the moment of opening of that exhaust vales 29 is retarded with respect to the normal valve opening timing.

In the example of FIG. 6, the burned gases in the lean-burn operated #3 cylinder 21 are kept compressed during a period between the moment of initiation of the exhaust stroke (with its piston 22 at its bottom dead center) and the retarded moment of opening of the exhaust valves 29, so that a portion of the output torque produced by the rich-burn operated #4 cylinder 21 is consumed by the #3 cylinder 21 to compress the burned gases therein after the exhaust stroke is initiated, whereby the effective output torque of the #4 cylinder 21 is reduced.

In the example of FIG. 7, too, the #4 cylinder 21 is selected as the rich-burned operated cylinder 21, and the #1 through #3 cylinders 21 are lean-burn operated. However, the exhaust valves 29 of the rich-burn operated #4 cylinder 21 are opened in the process of the expansion stroke, namely, the moment of opening of those exhaust valves 29 is advanced with respect to the normal valve opening timing.

In the example of FIG. 7, the exhaustion of the burned gases from the rich-burned operated #4 cylinder 21 is initiated in the expansion stroke, so that the pressure acting on the piston 22 in that #4 cylinder is reduced in the expansion stroke, whereby only a portion of the combustion pressure in the #4 cylinder 21 is converted into the output torque of the crankshaft 23.

The purification assisting control in the example of FIG. 7 will be described in detail, by reference to the flowchart of FIG. 8 which illustrates a purification assisting control routine executed by the CPU 401 according to the control program stored in the ROM 402. This routine is repeatedly executed by the CPU 401 with a predetermined cycle time, for instance, each time the crankshaft 23 is rotated over an angle of 720°.

The purification assisting control routine of FIG. 8 is initiated with step S801 to read from the RAM 403 various kinds of data such as the engine speed and the operating amount of the accelerator pedal 42 as represented by the output signal of the accelerator position sensor 43. Then, the control flow proceeds to step S802 in which the CPU 401 determines the operating condition of the engine 1 on the basis of the engine speed and the operating amount of the accelerator pedal 42.

Step S802 is followed by step S803 in which the CPU 401 determines whether the engine 1 is in a lean-burn state. This determination is made on the basis of the determination of the operating state of the engine 1 in step S802.

If a negative decision (NO) is obtained in step S803, one cycle of execution of the present routine is terminated. If an affirmative decision (YES) is obtained in step S803, the control flow goes to step S804.

In step S804, the CPU 401 calculates the presently required output torque of the engine 1, on the basis of the engine speed and the operating amount of the accelerator pedal 42 which were read in step S801. The required engine output torque may be determined according to a predetermined relationship between the engine speed and operating amount of the accelerator pedal 42 and the required engine output torque. This relationship is obtained by experimentation, and a data map representing this relationship is stored in the ROM 402.

The control flow then proceeds to step S805 in which the CPU 401 calculates a required output torque of each cylinder 21, on the basis of the required output torque of the engine 1 calculated in step S804. This required output torque of each cylinder 21 will be referred to as "required output torque per cylinder". Step S803 described above may follow this step S805.

Step S805 is followed by step S806 in which the CPU 401 determines a target air/fuel ratio of an air-fuel mixture to be burned in each lean-burn operated cylinder 21 and a target amount of intake air to be drawn into each lean-burn operated cylinder 21 (hereinafter referred to as "target intake air amount per cylinder"), so that the actual output torque produced by each lean-burn operated cylinder 21 coincides with the required output torque per cylinder and so that the amount of fuel injection into each lean-burn operated cylinder 21 is minimized.

The control flow then proceeds to step S807 in which the CPU 401 determines target opening and closing timings of the intake valves 28 and target opening and closing timings of the exhaust valves 29 of each lean-burn operated cylinder 21, according to the target air/fuel ratio and the target intake air amount per cylinder which were calculated in step S806. In step S807, the CPU 401 further operates to calculate the target fuel injection amount of each lean-burn operated cylinder 21 by dividing the target intake air amount per cylinder by the target air/fuel ratio.

In the next step S808, the CPU 401 first estimates an amount of nitrogen oxides (NOx) that are emitted from each lean-burn operated cylinder 21 when the cylinder 21 is operated with a fuel-lean air-fuel mixture that satisfies the target air-fuel ratio and the target intake air amount per cylinder. Then, the CPU 401 calculates the total amount of nitrogen oxides emitted from all of the three lean-burn operated cylinders 21, by multiplying the estimated amount by three.

The control flow then proceeds to step S809 to calculate an amount of reducing agents required to reduce the total amount of nitrogen oxides calculated in step S808.

Then, the control flow proceeds to step S810 in which the CPU 401 first calculates the lowest air/fuel ratio of an air-fuel mixture that is combustible in the rich-burn operated cylinder 21. This lowest air/fuel ration will be referred to as "target air/fuel ratio of the rich-burn operated cylinder 21". Then, the CPU 401 calculates an amount of reducing agents to be contained in unit volume of exhaust gases emitted as a result of combustion of the air-fuel mixture having the target air/fuel ratio, and calculates the amount of exhaust gases to-be emitted from the rich-burn operated cylinder 21, in other words, the required amount of intake air to be drawn into the rich-burn operated cylinder 21, by dividing the above-indicated target amount of reducing agents by the calculated amount of reducing agents. The above-indicated required amount of intake air into the rich-burn operated cylinder 21 will be referred to as "target intake air amount of the rich-burn operated cylinder".

Step S810 is followed by step S811 to determine target opening and closing timings of the intake valves 28 of the rich-burn operated cylinder 21 on the basis of the target intake air amount of the rich-burn operated cylinder 21 calculated in step S810, and then calculates a target amount of fuel injected into the rich-burn operated cylinder 21, by dividing the target intake air amount of the rich-burn operated cylinder 21 by the target air/fuel ratio of the rich-burn operated cylinder 21.

Step S811 is followed by step S812 in which the CPU 401 estimates an output torque produced by the rich-burn operated cylinder 21 when this cylinder 21 is operated with an air-fuel mixture which satisfies the target air/fuel ratio and the target intake air amount of the rich-burn operated cylinder 21, which were calculated in step S810.

The control flow then proceeds to step S813 in which the CPU 401 determines target opening and closing timings of the exhaust valves 29 of the rich-burn operated cylinder 21 so that the output torque estimated in step S812 is reduced to the required output torque calculated in step S805.

In the next step S814, the CPU 401 controls the intake vale driver circuits 30a, exhaust valve driver circuits 31a and fuel injector valves 32 of the lean-burn operated cylinders 21, according to the target opening and closing timings of the intake valves 28, the target opening and closing timings of the exhaust valves 29 and the required fuel injection amount, which were calculated in step S807. The CPU 401 further controls the intake valve driver circuit 30a, the exhaust valve driver circuit 31a and the fuel injector valve 32 of the rich-burn operated cylinder 21, according to the target opening and closing timings of the intake and exhaust valves 28, 29 and the target fuel injection amount, which were determined in steps S811 and S813.

In the example of FIG. 8, the three lean-burn operated cylinders 21 are successively operated with a fuel-lean air-fuel mixture, and then the rich-burn operated cylinder 21 is operated with the air-fuel mixture having the target air/fuel mixture. As a result, the fuel-lean exhaust gases are successively emitted from the lean-burn operated cylinders 21, and then the fuel-rich exhaust gases are emitted from the rich-burn operated cylinder 21.

The exhaust gases emitted from the rich-burn operated cylinder 21 contain an amount of reducing agents which corresponds to the total amount of nitrogen oxides (NOx) contained in the exhaust gases emitted from the three lean-burn operated cylinders 21. The occlusion-reduction type NOx catalyst 46 occludes or absorbs the nitrogen oxides contained in the exhaust gases successively emitted from the three lean-burn operated cylinders 21, and the total amount of the nitrogen oxides occluded in the NOx catalyst 46 is released or removed when the NOx catalyst 46 is subsequently exposed to the exhaust gases emitted from the rich-burn operated cylinder 21.

Thus, the purification assisting control according to the routine of FIG. 8 is arranged to effect the occlusion and reduction of the nitrogen oxides (NOx) in and at the Nox catalyst 46 in each cycle of operation of the internal combustion engine 1. This arrangement facilitates matching between the amount of occlusion of the nitrogen oxides and the amount of the reducing agents contained in the exhaust gases, making it possible to reduce the operating load on the CPU 401.

In the purification assisting control of FIGS. 7 and 8, the output torque of the rich-burn operated cylinder 21 is made equal to that of each lean-burn operated cylinder 21, by controlling the opening and closing timings of the exhaust valves 29 of the rich-burn operated cylinder 21, so that the overall output torque of the engine 1 does not suffer from an undesirable variation.

While the second embodiment of FIGS. 6–8 is adapted to use the same cylinder 21 of the engine 1 as the rich-burn operated cylinder 21, all or a plurality of the cylinders 21 may be sequentially used as the rich-burn operated cylinder 21 at predetermined intervals. This modification is effective to prevent undesirable deposits from remaining in the rich-burn operated cylinder 21, or prevent smoking of the spark plug 25 of the rich-burn operated cylinder 21.

A third embodiment of this invention will be next described with reference to the flowchart of FIG. 9. The third embodiment is different from the first and second embodiments, only in the purification assisting control performed by the CPU 401.

The first and second embodiments are arranged to operate the selected cylinder 21 with a fuel-rich air-fuel mixture having a relatively low air/fuel ratio so that hydrocarbon (HC) that is contained in a relatively large amount in the exhaust gases emitted from the rich-burn operated cylinder 21 is supplied as a reducing agent to the occlusion-reduction type NOx catalyst 46. On the other hand, the third embodiment is arranged to supply the NOx catalyst with reducing agents in the form of hydrogen ($H_2$) and carbon monoxide (CO) having a higher ability of reducing nitrogen oxides (NOx) than hydrocarbon (HC).

Figure 9:
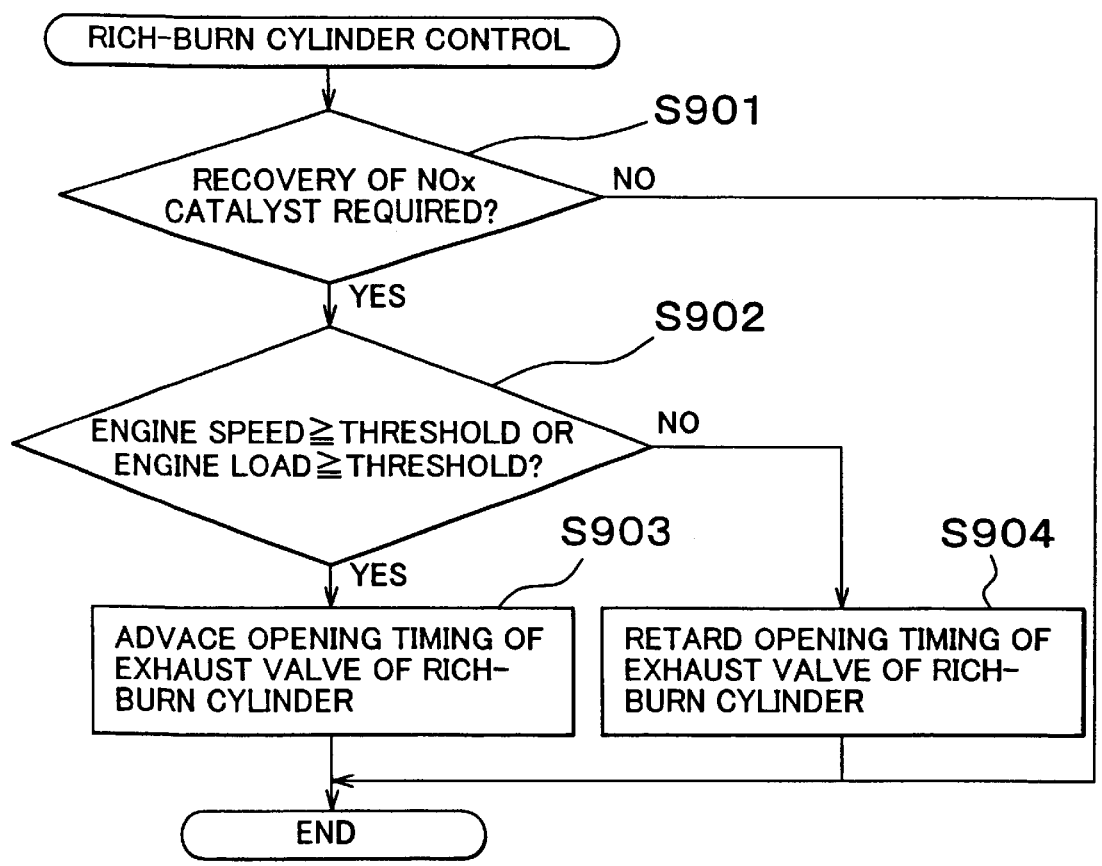
FIG. 9 is a flowchart illustrating a rich-burn cylinder control routine according to a third embodiment of this invention.

The CPU 401 executes a rich-burn cylinder control routine illustrated in the flowchart of FIG. 9 according to a control program stored in the ROM 402, when it becomes necessary to perform a rich-burn operation of the selected cylinder 21 with a fuel-rich air-fuel mixture for the purpose of recovering the NOx catalyst 46 into a state suitable for reducing and removing the nitrogen oxides.

The rich-burn cylinder control routine of FIG. 9 is initiated with step S901 to determine whether the occlusion-reduction type NOx catalyst 46 is required to be supplied with the reducing agents, to recover its original NOx occluding or absorbing ability.

If it is determined in step S901 that the NOx catalyst 46 is not required to be supplied with the reducing agents for recovering its original NOx occluding ability, one cycle of execution of the routine of FIG. 9 is terminated.

If it is determined in step S901 that the NOx catalyst 46 is required to be supplied with the reducing agents for recovering its original NOx occluding ability, the CPU 401 executes step S902.

In step S902, the CPU 401 determines whether the revolving speed of the engine 1 is equal to or higher than a predetermined threshold, or the load acting on the engine 1 is equal to or larger than a predetermined threshold.

If it is determined in step S902 that the revolving speed of the engine 1 is equal to or higher than the threshold, and/or the load of the engine 1 is equal to or larger than the threshold, the control flow proceeds to step S903 in which the moment of opening of the exhaust valves 29 of the rich-burn operated cylinder 21 is advanced.

Regarding the opening timing of the exhaust valves 29 of the rich-burn operated cylinder 21, it is noted that hydrogen ($H_2$) is produced as a result of thermal decomposition upon combustion of hydrocarbon (HC) contained in the air-fuel mixture, and the thus produced hydrogen is bonded with oxygen and carbon to produce water ($H_2O$) and hydrocarbon (HC) as the combustion further progresses. By opening the exhaust valves 29 in the process of combustion of the air-fuel mixture, the emitted exhaust gases contain a comparatively large amount of hydrogen ($H_2$). When the NOx catalyst 46 is exposed to the emitted exhaust gases containing such a large amount of hydrogen, nitrogen oxides (NOx) stored in the NOx catalyst 46 are efficiency reduced in a short time with the hydrogen.

If it is determined in step S902 that the engine speed is lower than the threshold and the engine load is smaller than the threshold, the control flow proceeds to step S904 in which the moment of opening of the exhaust valve 29 of the rich-burn operated cylinder 21 is retarded.

Hydrocarbon (HC) remaining in the rich-burn operated cylinder 21 after the combustion of the air-fuel mixture is oxidized at a high temperature and in an oxidizing atmosphere, to produce carbon monoxide (CO). Therefore, the exhaust gases emitted from the rich-burn operated cylinder 21 contain a comparatively large amount of carbon monoxide (CO), when the moment of opening of the exhaust valve 29 is retarded to a suitable point of time after the termination of combustion of the air-fuel mixture.

Since the exhaust gases emitted from the rich-burn operated cylinder 21 contain a large amount of carbon monoxide (CO) having a higher reducing ability than hydrocarbon (HC), the nitrogen oxides (NOx) stored in the NOx catalyst 46 are efficiently reduced in a short time with the carbon monoxide when the NOx catalyst 46 is exposed to the emitted exhaust gases.

Thus, the rich-burn cylinder control routine executed by the CPU 402 enables the NOx catalyst 46 to recover its original NOx occluding ability by reduction of nitrogen oxides with hydrogen ($H_2$) or carbon monoxide (CO), in a shorter time than in the case where hydrocarbon (HC) is used as the reducing agent. Accordingly, the required time of the rich-burn operation of the selected cylinder 21 for the purpose of recovering the original NOx occluding ability can be further shortened, leading to further reduction of the required amount of consumption of the fuel.

A fourth embodiment of this invention will be described referring to the flowchart of FIG. 10. The fourth embodiment is different from the first through third embodiments, only in the purification assisting control performed by the CPU 401.

While the first through third embodiments are arranged to recover the original NOx occluding ability of the NOx catalyst 46 by reducing and removing the nitrogen oxides (NOx) stored in the NOx catalyst 46, the fourth embodiment is arranged to remove SOx poisoning of the occlusion-reduction type NOx catalyst 46.

When the exhaust gases to which the NOx catalyst 46 is exposed are fuel-lean, the NOx catalyst 46 occludes or absorbs nitrogen oxides (NOx) contained in the exhaust gases. However, the NOx catalyst 46 also occludes or absorbs a sulfur component contained in the exhaust gases, in the same manner as the nitrogen oxides, whereby the NOx occluding ability of the NOx catalyst 46 is reduced. This phenomenon is a so-called "SOx poisoning" of the NOx catalyst 46.

Described in detail, sulfur oxides (SOx) such as SO2 and SO3 are produced as a result of combustion of the sulfur (S) component contained in the fuel used in the engine 1. Therefore, the exhaust gases to which the NOx catalyst 46 is exposed contain the sulfur component.

When the exhaust gases are fuel-lean, oxygen $O_2^-$ or $O^{2-}$ are deposited on the surface of platinum (Pt) carried on the substrate of the NOx catalyst 46, so that the sulfur oxides (SOx) contained in the exhaust gases react with oxygen $O_2^-$ or $O^{2-}$ to form $SO_3^-$ or $SO_4^-$.

The $SO_3^-$ or $SO_4^-$ formed on the platinum (Pt) of the NOx catalyst 46 are further oxidized on the platinum, and are absorbed in the NOx catalyst 46 as sulphate ion ($SO_4^{2-}$). The sulphate ion ($SO_4^{2-}$) absorbed in the NOx catalyst 46 are bonded with barium oxide (BaO) to form barium sulfate ($BaSO_4$).

Barium sulfate ($BaSO_4$) has properties that it is decomposed with more difficulty and more easily agglomerated than nitrogen oxides (NOx). Accordingly, barium sulfate is more likely to remain in the NOx catalyst 46 since barium sulfate is unlikely to be decomposed even when the NOx catalyst 46 is exposed to fuel-rich exhaust gases.

Therefore, the amount of barium sulfate ($BaSO_4$) in the NOx catalyst 46 increases with the time, so that the amount of barium oxide (BaO) which serves to enable the NOx catalyst 46 to occlude nitrogen oxides (NOx) is reduced, resulting in reduction in the NOx occluding ability of the NOx catalyst 46.

To remove the SOx poisoning of the occlusion-reduction type catalyst 46, the temperature of the atmosphere in which the NOx catalyst 46 exists must be raised to a considerably high level (e.g., 500–700° C.), and the exhaust gases to which the NOx catalyst 46 is exposed must be fuel-rich, i.e., have a considerably low air/fuel ratio.

That is, barium sulfate ($BaSO_4$) produced within the NOx catalyst 46 is thermally decomposed into $SO_3^-$ or $SO_4^-$ when the temperature of the atmosphere of the NOx catalyst 46 is raised. When the exhaust gases to which the NOx catalyst 46 is exposed are fuel-rich at that time, $SO_3^-$ or $SO_4^-$ react with hydrocarbon (IC) and carbon monoxide (CO) contained in the fuel-rich exhaust gases, and are reduced into gaseous $SO_2^-$, whereby sulfur dioxides (SOx) are released from the NOx catalyst 46.

For example, the atmosphere to which the NOx catalyst 46 is exposed can be controlled to be hot and fuel-rich, by supplying the NOx catalyst 46 with fuel-rich exhaust gases containing large amounts of unburned fuel components and oxygen, so that the unburned fuel components are burned by reaction with oxygen.

The exhaust gases containing large amounts of unburned fuel components and oxygen can be produced, for instance, by either of the following two methods: (1) operating the engine 1 with a fuel-rich air-fuel mixture so that the exhaust gases are fuel-rich, and introducing additional air into the exhaust passage at a point upstream of the NOx catalyst 46, so that the exhaust gases contain unburned fuel components and oxygen; and (2) operating at least one of the cylinders 21 of the engine 1 with a fuel-rich air-fuel mixture, while at the same time operating the other cylinder or cylinders 21 with a fuel-lean air-fuel mixture, so that fuel-rich exhaust gases containing a large amount of unburned fuel components and oxygen-rich exhaust gases containing a large amount of oxygen are mixed together. In the present embodiment, however, the following method is employed in the light of the function of the electromagnetic valve drive mechanisms 30, 31 capable of controlling the opening and closing timings of the intake and exhaust valves 28, 29 as needed.

Namely, when it becomes necessary to remove the SOx poisoning of the NOx catalyst 46, the CPU 401 controls the fuel injector valve 32 of each cylinder 21 of the engine 1 for operating each cylinder 21 with a fuel-rich air-fuel mixture, and advance the moment of opening of the exhaust valves 29 to a point in the expansion stroke, so that the air-fuel mixture in the process of combustion is discharged from the cylinder 21 as exhaust gases.

The above arrangement provides exhaust gases having a higher temperature and larger amounts of unburned fuel components and oxygen than exhaust gases that are discharged from the relevant cylinder 21 after the air-fuel mixture has been completely burned.

The amounts of unburned fuel components and oxygen contained in the exhaust gases may also be increased by retarding the ignition timing of the spark plug 25 of each cylinder 21 so as to retard the combustion of the air-fuel mixture.

When the air-fuel mixture in the process of combustion is emitted from each cylinder 21, the combustion pressure in each cylinder 21 is lowered, and the efficiency of conversion of the compression pressure into the torque of the crankshaft 23 is lowered, resulting in reduction of the output torque of the engine 1.

To prevent the reduction of the engine output, the CPU 401 changes the opening and closing timings of the intake valves 28 of each cylinder 21 so as to increase the intake air amount, and increases the fuel injection amount. The amount of intake air to be drawn into each cylinder 21 can be increased by increasing the opening of the throttle valve 39, in addition to changing the opening and closing timings of the intake valves 28.

The purification assisting control according to the fourth embodiment of this invention will be described in detail.

Figure 10:
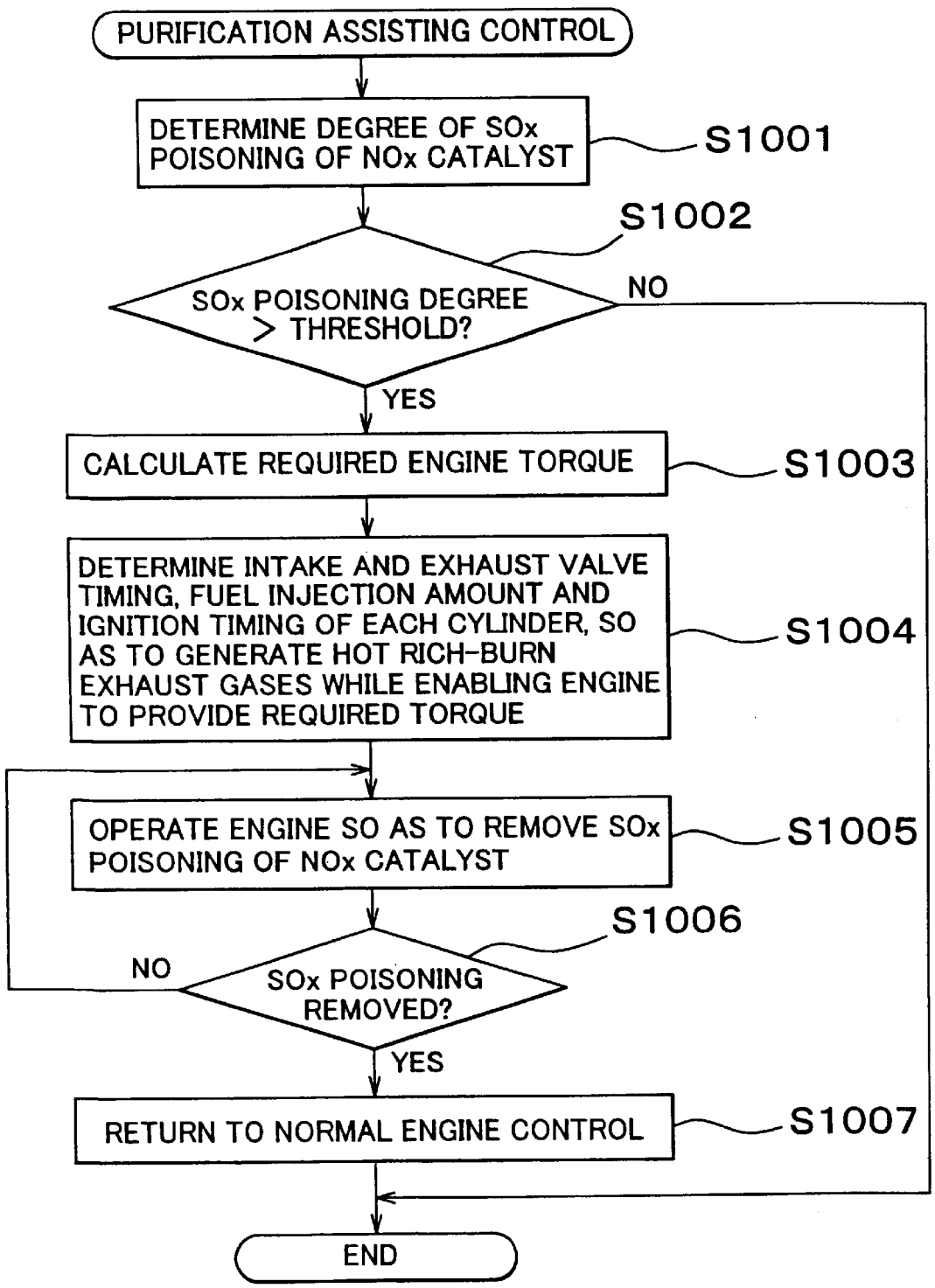
FIG. 10 is a flowchart illustrating a purification assisting control routine according to a fourth embodiment of this invention.

To perform the purification assisting control, the CPU 401 operates to execute a purification assisting control routine illustrated in the flowchart of FIG. 10, according to a control program also stored in the ROM 402. This control routine is repeatedly executed with a predetermined cycle time (for instance, each time the crankshaft position sensor 51 generates a pulse signal).

The purification assisting control routine of FIG. 10 is initiated with step S1001 in which the CPU 401 determines the degree of SOx poisoning of the occlusion-reduction type NOx catalyst 46. This determination in step S1001 can be effected, for instance, on the basis of the output signal of the NOx sensor 49 disposed downstream of the NOx catalyst 46, when the exhaust gases to which the NOx catalyst 46 is exposed are fuel-lean. Alternatively, the degree of the SOx poisoning of the NOx catalyst 46 can be estimated on the basis of the cumulative time of operation of the engine 1 with a fuel-lean air-fuel mixture, the cumulative amount of intake air that have been drawn into the engine 1, and/or the cumulative amount of fuel injection into the engine 1.

Step S1001 is followed by step S1002 in which the CPU 401 determines whether the degree of the SOx poisoning of the NOx catalyst 46 is larger than a predetermined threshold. This threshold is obtained by experimentation and stored in the ROM 402.

If it is determined in step S1002 that the degree of the SOx poisoning of the NOx catalyst 46 is not larger than the threshold, the CPU 401 determines that it is not necessary to execute further steps for removing the SOx poisoning of the NOx catalyst 46. In this case, one cycle of execution of the routine of FIG. 10 is terminated.

If it is determined in step S1002 that the degree of the SOx poisoning of the NOx catalyst 46 is larger than the threshold, the CPU 401 determines that it is necessary to execute the further steps for removing the SOx poisoning of the NOx catalyst 46, and the control flow proceeds to step S1003.

In step S1003, the CPU 401 reads from the RAM 403 the revolving speed of the engine 1 and the operating amount of the accelerator pedal 42 represented by the output signal of the accelerator position sensor 43, and calculates a required output torque of the engine 1 on the basis of the engine speed and the operating amount of the accelerator pedal 42.

In the next step S1004, the CPU 401 determines desired opening and closing timings of the intake valves 28 and the exhaust valves 29, a required amount of fuel injection and a desired ignition timing of the spark plugs 25, so that the NOx catalyst 46 is exposed to the exhaust gases containing unburned fuel components and oxygen, while the engine 1 is enabled to produce the required output torque calculated in step S1003.

Described in detail, the CPU 401 first calculates the desired air/fuel ratio of an air-fuel mixture to be burned in each cylinder 21, and then determines the desired opening timing of the exhaust valves 29 and the desired ignition timing of the spark plug 25 such that the moment of opening of the exhaust vale 28 is advanced and the ignition timing is retarded, for the air-fuel mixture in the process of combustion to be exhausted from each cylinder 21.

Then, the CPU 401 determines the required intake air amount and the required fuel injection amount so that the actual output torque of the engine 1 operated according to the determined desired air/fuel mixture, desired opening timing of the exhaust valves 29 and desired ignition timing coincides with the determined required output torque. The CPU 401 then determines the opening and closing timings of the intake valves 28 on the basis of the determined required intake air amount.

Step S1004 is followed by step S1005 in which the CPU 401 controls the intake valve driver circuit 30a, exhaust valve driver circuit 31a, fuel injector valve 32 and spark plug 25 of each cylinder 21, according to the desired opening and closing timings of the intake valves 28, desired opening and closing timings of the exhaust valves 29, required fuel injection amount and desired ignition timing, which were determined in step S1004, so that the SOx poisoning of the NOx catalyst 46 is removed.

As a result, the engine 1 emits the hot exhaust gases containing large amounts of unburned fuel components and oxygen, while providing the required output torque. The NOx catalyst 46 is exposed to the emitted exhaust gases flowing through the exhaust manifold 45. Accordingly, the NOx catalyst 46 is heated by the heat of the exhaust gases, and the unburned fuel components react with oxygen on the platinum (Pt) of the NOx catalyst 46, so that the NOx catalyst 46 is further heated by heat generated in the reaction.

When the atmosphere surrounding the NOx catalyst 46 is held at a high temperature, barium sulfate ($BaSO_4$) in the NOx catalyst 46 is thermally decomposed into $SO_3^-$ or $SO_4^-$, which in turn are reduced to $SO_2^-$ by reaction with hydrocarbon (HC) and carbon monoxide (CO) contained in the exhaust gases, and $SO_2^-$ is released from the NOx catalyst 46.

Step S1005 is followed by step S1006 in which the CPU 401 determines whether the SOx poisoning of the NOx catalyst 46 has been removed. This determination may be made by determining whether the cumulative time of rich-burn operation of the engine 1 in step S1005 is long enough to remove the SOx poisoning. To make this determination, a predetermined relationship between the degree of SOx poisoning of the NOx catalyst 46 and a sufficient SOx removal time is obtained by experimentation and stored in the ROM 402. The determination as to whether the SOx poisoning has been removed is made by determining whether the cumulative rich-burn operation of the engine 1 has increased to the sufficient SOx removal time that is determined on the basis of the degree of SOx poisoning and according to the predetermined relationship. Alternatively, an SOx sensor is attached to the exhaust pipe 47 downstream of the NOx catalyst 46, and the determination as to whether the SOx poisoning of the NOx catalyst 46 has been removed is made by determining whether the SOx concentration of the exhaust gases in the exhaust pipe 46 as represented by the output signal of the SOx sensor has been reduced to a predetermined value.

If it is determined in step S1006 that the SOx poisoning of the NOx catalyst 46 has not been removed yet, the control flow returns to step S1005.

If it is determined in step S1006 that the SOx poisoning has been removed, the control flow proceeds to step S1007 in which the CPU 401 controls the intake valve driver circuits 30a, exhaust valve driver circuits 31a and the spark plugs 25, to establish the normal opening and closing timings of the intake and exhaust valves 28, 29 and the normal ignition timing, and controls the fuel injector valves 32 to establish the normal fuel injection amount.

According to the purification assisting control described above, the exhaust gases emitted from the engine 1 can be controlled to be hot and to contain large amounts of unburned fuel components and oxygen, by controlling the opening and closing timings of the intake and exhaust valves 28, 29. As a result, the required time for removing the SOx poisoning can be significantly reduced, that is, the required time for the rich-burn operation of the engine for removing the SOx poisoning can be reduced, thus minimizing deterioration of the vehicle driveability and an increase in the amount of consumption of the fuel.

Although the fourth embodiment is arranged to remove the SOx poisoning of the NOx catalyst 46 by operating the engine 1 with a fuel-rich air-fuel mixture while the opening timing of the exhaust valves 28 is advanced for easy cylinder 21, it is possible to supply the NOx catalyst 46 with an unburned fuel, by operating the fuel injector valve 32 of each cylinder 21 while the intake and exhaust valves 28, 29 are both open, so that the unburned fuel is burned at the NOx catalyst 46, for efficiently controlling the atmosphere surrounding the NOx catalyst 46 to be sufficiently hot and fuel-rich.

Referring next to FIGS. 11–15, there will be described a fifth embodiment of this invention as applied to an internal combustion engine provided with a variable valve control system.

Figure 11:
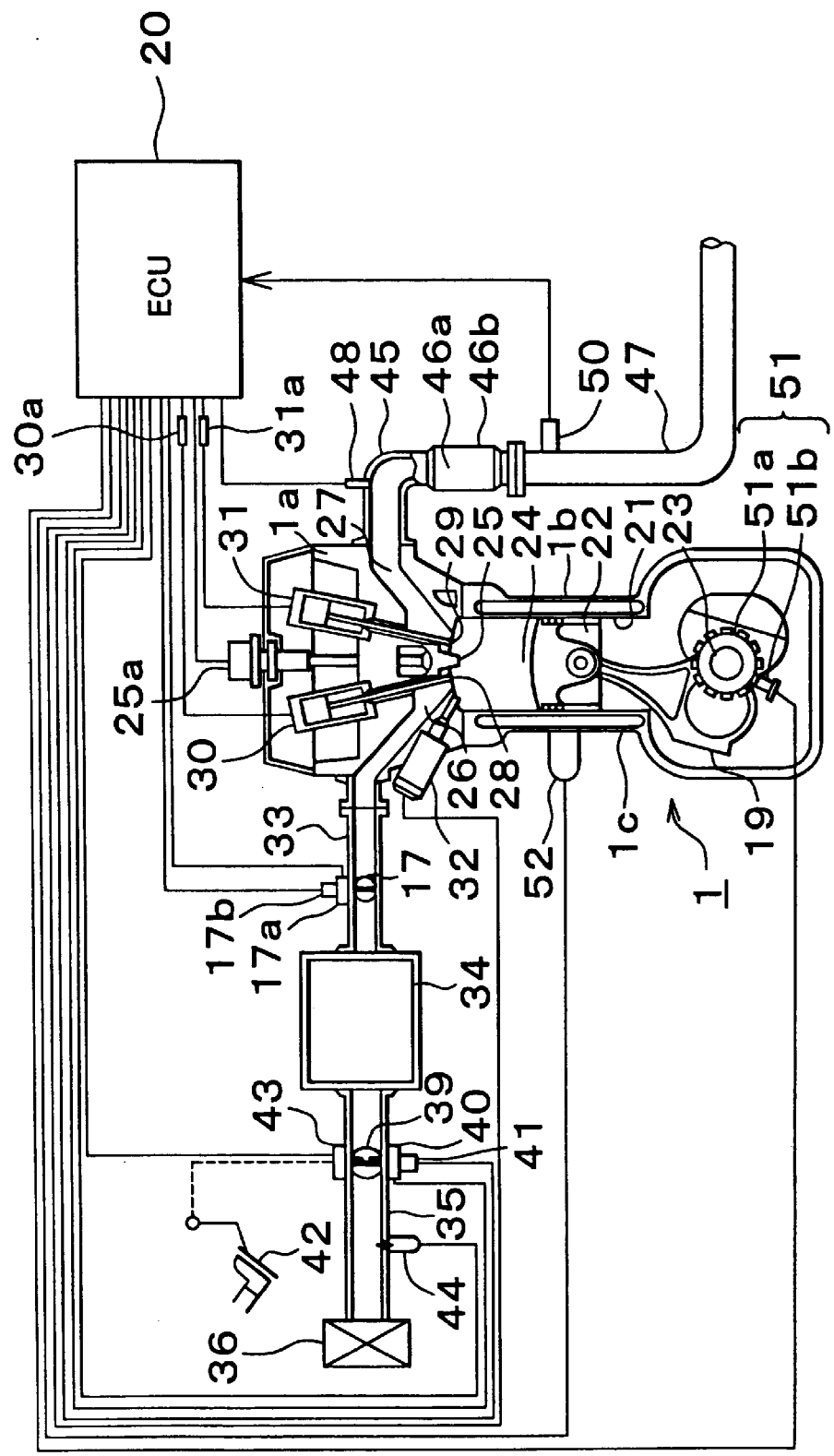
FIG. 11 is an elevational view schematically showing an internal combustion engine including a variable valve control system according to a fifth embodiment of the invention.

The internal combustion engine with the intake and exhaust systems is schematically shown in FIG. 11. Since this internal combustion engine is almost identical with that of FIG. 1 and FIG. 2 to which the first embodiment is applied, only the aspects of the engine 1 of FIG. 11 that are different from the engine of FIG. 1 and FIG. 2 will be described.

In the engine 1 of FIG. 2 according to the first embodiment, each fuel injector valve 32 is attached to the cylinder head 1a, at a position near the point of connection of the corresponding branch intake pipe to the cylinder head 1a, such that the fuel outlet of the fuel injector valve 32 is open to the intake ports 26 of the corresponding cylinder 21. In the engine 1 of FIG. 11 according to the fifth embodiment, each fuel injector valve 32 is attached to the cylinder head 1a such that the fuel outlet is open to the combustion chamber 24 of the corresponding cylinder 21 so that the fuel is injected from the fuel injector valve 32 directly into the combustion chamber 24.

As in the first embodiment, the two intake ports 26 and the two exhaust ports 27 are open to the combustion chamber 24 of each cylinder 21. In the present embodiment, one of the two intake ports 26 is a straight port extending straight to the combustion chamber 24, and the other intake port 26 is a swirl port in the form of a helical port which is formed so as to cause a swirl of the intake air drawn into the combustion chamber 24.

The intake manifold 33 having four branch intake pipes is attached to the cylinder head 1a, and the intake ports 26 of the cylinders 21 are respectively connected to the branch intake pipes of the intake manifold 33.

In each branch pipe of the intake manifold 33 that communicates with each straight intake port 26, there is provided a swirl control valve 17 for controlling the rate of flow of the intake air through that branch pipe. The swirl control valve 17 is provided with an SCV actuator 17a and a SCV position sensor 17b. The SCV actuator 17a includes a stepping motor for controlling the angle or amount of opening of the swirl control valve 17 according to an amount of electric current applied to the stepping motor. The SCV position sensor 17b generates an output signal indicative of the amount of opening of the swirl control valve.

A casing 46b that is connected to the exhaust manifold 45 houses an occlusion-reduction type NOx catalyst 46a similar to the NOx catalyst 46a used in the preceding embodiments. The NOx catalyst 46a has both a three-way catalytic function and an occlusion-and-reduction function. The three-way catalytic function is a function of reducing or removing hydrocarbon (HC), carbon monoxide (CO) and nitrogen oxides (NOx) contained in exhaust gases which are emitted from the engine 1 when the emitted exhaust gases have the stoichiometric air/fuel ratio or an air/fuel ratio close to the stoichiometric value. The occlusion-and-reduction function is a function of occluding or absorbing nitrogen oxides (NOx) contained in exhaust gases which are fuel-lean, namely, have an air/fuel ratio higher than the stoichiometric value, and releasing the nitrogen oxides (NOx) occluded or absorbed in the NOx catalyst 46a when the emitted exhaust gases are stoichiometric or fuel-rich, namely, have the stoichiometric air/fuel ratio or an air/fuel ratio lower than the stoichiometric value. The occlusion-and-reduction function further includes a function of immediately reducing the emitted nitrogen oxides (NOx) into nitrogen ($N_2$) by reaction of the nitrogen oxides with unburned hydrocarbon (HC) and carbon monoxide (CO) contained in the stoichiometric or fuel-rich exhaust gases.

Therefore, the NOx catalyst 46a disposed in the exhaust passage of the engine 1 is capable of reducing or removing HC, CO and NOx contained in exhaust gases emitted from the engine 1 as a result of operation of the engine with a fuel-lean air-fuel mixture, by suitably controlling the air-fuel ratio of the emitted exhaust gases. In the present embodiment, the amount of NOx which has been occluded in the NOx catalyst 46a is estimated on the basis of the operating hysteresis or the past operating condition of the engine 1, and the exhaust gases to which the NOx catalyst 46a is exposed are temporarily controlled to be in a fuel-rich state when the estimated amount of NOx occluded in the NOx catalyst 46a has increased to a predetermined upper limit, so that the occluded NOx is released from the NOx catalyst 46 and reduced into $N_2$. The manner of controlling the emitted exhaust gases to be fuel-rich in the present embodiment will be described in detail.

In the present embodiment, the air/fuel ratio of the exhaust gases is interpreted to mean a ratio of a total amount of air introduced into the combustion chamber 24 through the intake passage and air introduced into a portion of the exhaust passage upstream of the NOx catalyst 46a, to a total amount of a fuel (hydrocarbon) injected into the combustion chamber 24 and a fuel introduced into the above-indicated upstream portion of the exhaust passage. Where none of a fuel, a reducing agent and air is introduced in the upstream portion of the exhaust passage upstream of the NOx catalyst 46a, the air/fuel ratio of the exhaust gases is the same as the air/fuel ratio of an air-fuel mixture introduced into the combustion chamber 24.

In the fifth embodiment, the exhaust pipe 47 is provided with an exhaust gas temperature sensor 50 for detecting the temperature of the exhaust gases. This temperature is used as the temperature at the substrate of the NOx catalyst 46a.

Figure 12:
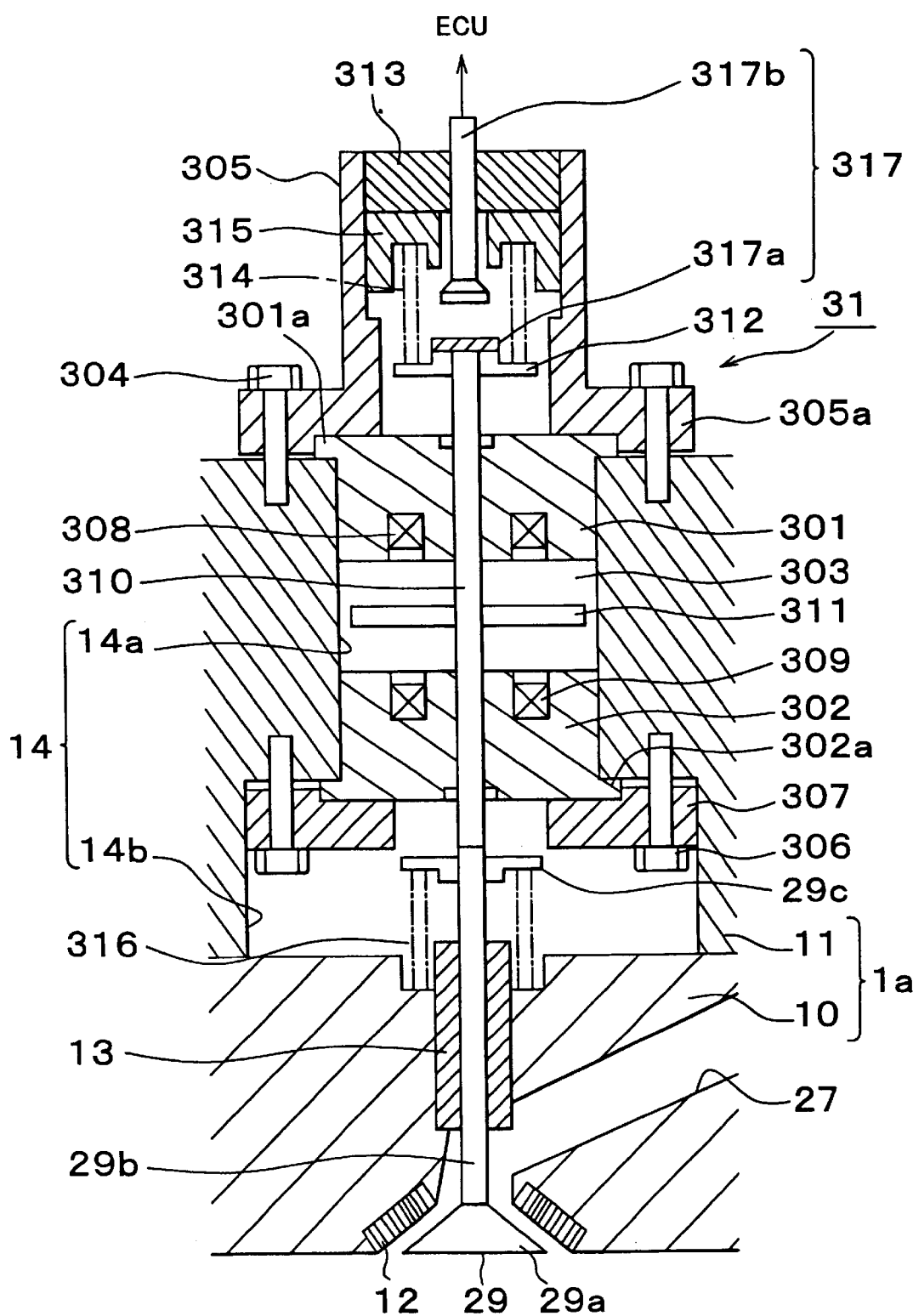
FIG. 12 is a view showing the interior of an electromagnetic drive mechanism for an exhaust valve in the engine of FIG. 11.

The cross-sectional view of FIG. 12 shows the electromagnetic exhaust valve drive mechanism 31 provided for each exhaust valve 29 for each cylinder 21. This mechanism 31 is substantially identical in construction with the electromagnetic intake valve mechanism 30 for each intake valve 28, which is shown in FIG. 3. A further description of the mechanism 31 is deemed unnecessary.

Figure 13:
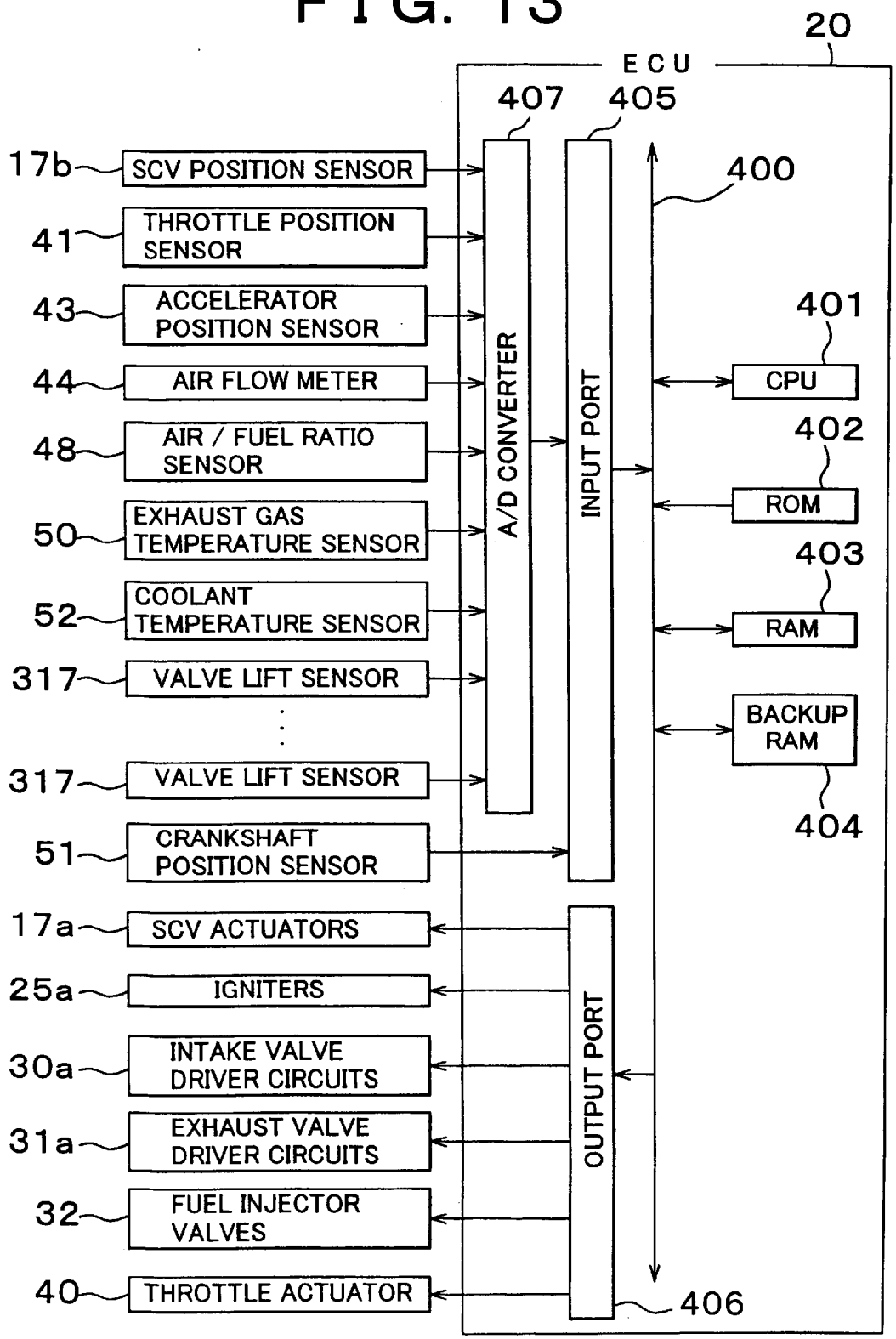
FIG. 13 is a block diagram showing an electronic control unit for controlling the engine of FIG. 11.

As in the first embodiment, the engine 1 is controlled by the electronic control unit (ECU) 20, as shown in FIG. 13.

The ECU 20 is constituted by a digital computer incorporating the CPU 401, ROM 402, RAM 403 and input and output ports 405, 406 which are connected to each other through the bidirectional bus 400, and further incorporating the A/D converter 407, as in the first embodiment.

The A/D converter 407 receives analog output signals of the sensors such as the SCV position sensors 17b, throttle position sensor 41, accelerator position sensor 43, air flow meter 44, air/fuel ratio sensor 48, exhaust gas temperature sensor 50, coolant temperature sensor 52 and valve lift sensors 317. These analog output signals are converted by the A/D converter 407 into respective digital signals, which are applied to the input port 405. The input port 405 directly receives a digital output signal of the crankshaft position sensor 51.

To the output port 406 of the ECU 20, there are electrically connected the SCV actuator 16a, igniters 25a, intake valve driver circuits 30a, exhaust valve driver circuits 31a, exhaust valve driver circuits 31a, fuel injector valves 32 and throttle actuator 40.

The ROM 402 of the ECU 20 stores various application programs such as programs for executing a fuel injection amount control routine for determining the amount of fuel injection into the cylinders 21, a fuel injection timing control routine for determining the timing of fuel injection into the cylinders 21, an ignition timing control routine for determining the ignition timing of the igniters 25a (spark plugs 25), a throttle valve opening control routine for determining the opening of the throttle valve 39, and an SCV opening control routine for determining the amount of opening of the swirl control valve 17 of each cylinder 21. The ROM 402 further stores programs for executing an intake valve timing control routine for determining the opening and closing timing of the intake valves 28, an exhaust valve timing control routine for determining the opening and closing timing of the exhaust valves 29, an intake valve driver current control routine for determining the amounts of electric current to be applied from the intake valve driver circuits 30a to the solenoid coils of the electromagnetic intake valve drive mechanisms 30, and an exhaust valve driver current control routine for determining the amounts of electric current to be applied from the exhaust valve driver circuits 31a to the solenoid coils of the electromagnetic exhaust valve drive mechanism 31.

The ROM 402 of the ECU 20 further stores various data maps, in addition to the application programs described above. The stored data maps include: various fuel injection amount control data maps representative of predetermined relationships between the operating state of the internal combustion engine 1 and the amount of fuel injection; a fuel injection timing control data map representative of a predetermined relationship between the operating state of the engine 1 and the timing of fuel injection; an ignition timing control data map representative of a predetermined relationship between the operating state of the engine 1 and the ignition timing of each spark plug 25; a throttle valve opening control data map representative of a predetermined relationship between the operating state of the engine 1 and the opening of the throttle valve 39; an SCV opening control data map representative of a predetermined relationship between the operating state of the engine 1 and the amount of opening of the swirl control valve 17; an intake valve timing control data map representative of a predetermined relationship between the operating state of the engine 1 and the opening and closing timing of the intake valves 28; an exhaust valve timing control data map representative of a predetermined relationship between the operating state of the engine 1 and the opening and closing timing of the exhaust valves 29; and a valve driver current control data map representative of predetermined relationships between the operating state of the engine 1 and the amounts of electric current to be applied to the electromagnetic intake and exhaust valve drive mechanisms 30, 31.

The RAM 403 is provided to temporarily store the output signals of the various sensors, and results of arithmetic operations performed by the CPU 401, such as the operating speed of the engine 1 as calculated on the basis of the output signal of the crankshaft position sensor 51. The signals and data stored in the RAM 403 are updated each time the ECU 20 receives the output signal of the crankshaft position sensor 51.

The backup RAM 404 is a non-volatile memory which retains data even after the operation of the engine 1 is stopped. The backup RAM 404 stores various data which are updated by learning.

The CPU 401 operates according to the application programs stored in the ROM 402, to execute the various control routines such as the fuel injection control routine, ignition timing control routine, throttle valve opening control routine, swirl control routine, intake valve timing control routine and exhaust valve timing control routine.

The CPU 401 determines or detects the operating condition of the engine 1 on the basis of the output signals of the crankshaft position sensor 51 and the accelerator position sensor 43 or the air flow meter 44, and controls the engine 1 according to the determined operating condition.

Figure 14:
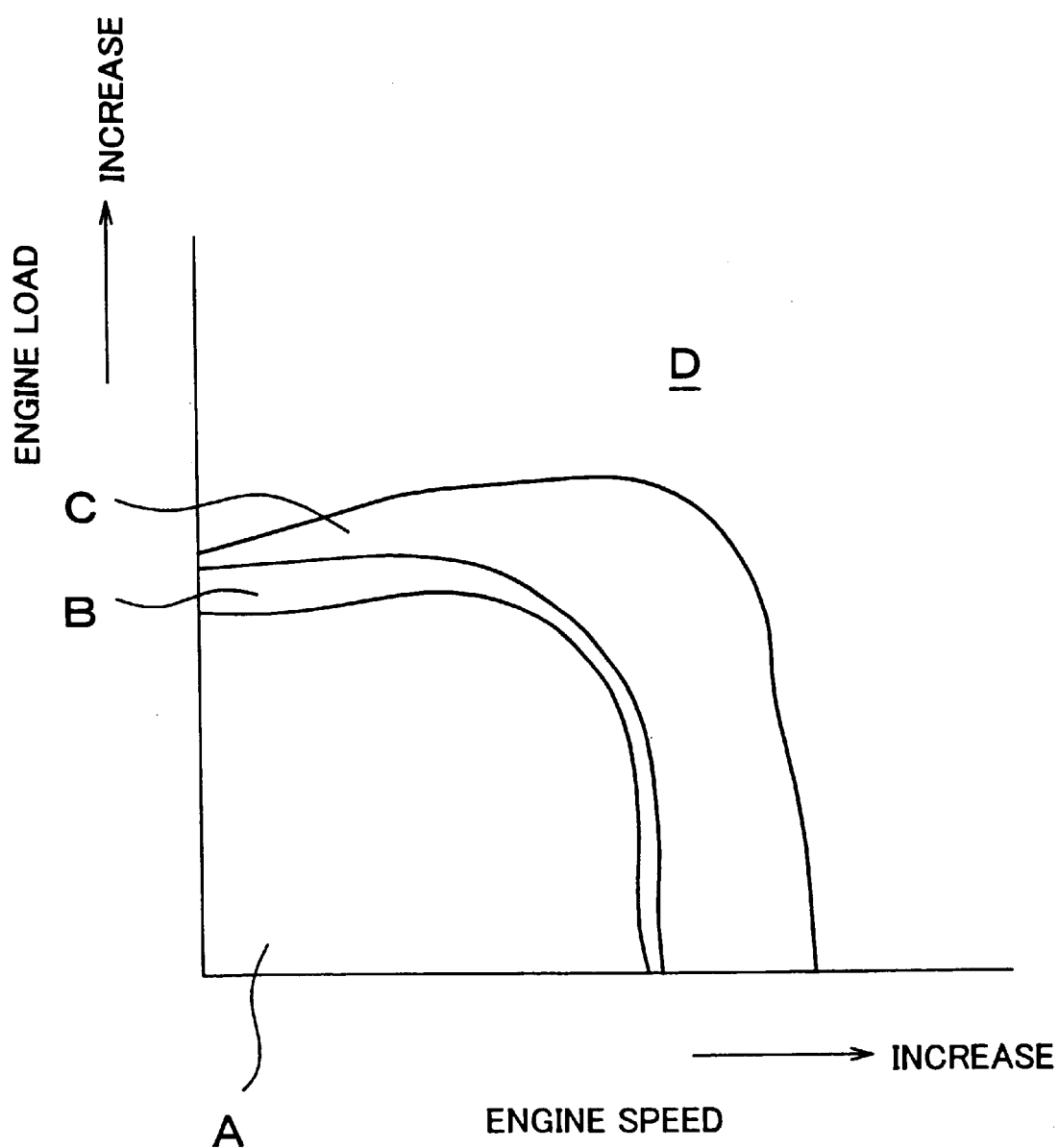
FIG. 14 is a graph indicating different conditions of combustion of air-fuel mixture in relation to the engine speed and the engine load.

The graph of FIG. 14 indicates a relationship between the operating state (as represented by the load and speed) of the engine 1 and the combustion state in the combustion chambers 24. The combustion in the combustion chambers 24 of the engine 1 will be explained by reference to FIG. 14.

When the CPU 401 determines that the engine 1 is in a low-load operating state indicated by region A in FIG. 14, the engine 1 is controlled to effect stratified charge combustion in each combustion chamber 24. To this end, the CPU 401 transmits a control signal to the SCV actuator 17a so as to reduce the angle or amount of the swirl control valve 17, and transmits a control signal to the throttle actuator 40 so as to substantially fully close the throttle valve 39. The CPU 401 further controls the fuel injector valve 32 in the compression stroke of each cylinder 21, to inject the fuel during the compression stroke.

In this case, air is introduced into the combustion chamber 24 of each cylinder 24 primarily through the helical intake port 26 during the intake stroke, so that a strong swirl of air is produced in the combustion chamber 24. In the following compression stroke, the fuel injected from the fuel injector valve 32 into the combustion chamber 24 is moved with the air swirl toward the spark plug 25 and reaches a position near the spark plug 25 at a given moment. Thus, a combustible air-fuel mixture is formed near the spark plug 25, and the formed air-fuel mixture is surrounded by the air, such that the combustible air-fuel mixture and the adjacent layers of the air cooperate to form a stratified charge, which as a whole is an extremely fuel-lean air-fuel atmosphere. The CPU 401 controls the igniter 25a to energize the spark plug 25 for igniting the air-fuel mixture. As a result, the atmosphere near the spark plug 25 (including the combustible air-fuel mixture and the adjacent air layers) is burned with the ignition of the combustible air-fuel mixture near the spark plug 25.

The amount of the fuel to be injected into the combustion chamber 24 for the stratified charge combustion indicated above is determined on the basis of the operating amount of the accelerator pedal 42 and the engine speed. To determine the amount of the fuel injection (the fuel injection time), the CPU 401 uses the first fuel injection amount control data map representative of the predetermined relationship between the fuel injection amount and the engine operating state as represented by the operating amount of the accelerator pedal 42 (represented by the output signal of the accelerator position sensor 43) and the engine speed.

The air/fuel ratio of the air-fuel mixture for the stratified charge combustion is selected within a range of 25–50, and the first fuel injection amount control data map for the stratified charge combustion is determined to correspond to this range of the air-fuel ratio.

When the CPU 401 determines that the engine 1 is in a medium-load operating state indicated by region C in FIG. 14, the engine 1 is controlled to effect uniform charge lean-burn combustion in each combustion chamber 24. To this end, the CPU 401 controls the SCV actuator 17a so as to reduce the angle of opening of the swirl control valve 17, and controls the fuel injector valve 32 in the intake stroke of each cylinder 21, to inject the fuel during the intake stroke. In this case, a fuel-lean air-fuel mixture consisting of fresh air and a fuel uniformly mixed together is formed over a substantially entire space in the combustion chamber 24 of each cylinder, and the fuel-lean air-fuel mixture is uniformly burned in the combustion chamber 24.

The fuel injection amount and the intake air amount for the uniform charge lean-burn combustion indicated above are determined on the basis of the operating amount of the accelerator pedal 42 and the engine speed. To determine the fuel injection amount or fuel injection time, the CPU 401 uses the second fuel injection amount control data map representative of the predetermined relationship among the output signal value of the accelerator position sensor 43 (the operating amount of the accelerator pedal 42), the engine speed and the fuel injection amount. To determine the intake air amount (the opening of the throttle valve 39), the CPU 401 uses the throttle valve opening control data map representative of the predetermined relationship among the output signal value of the accelerator position sensor 43 (operating amount of the accelerator pedal 42), the engine speed and the intake air amount (the opening of the throttle valve 38).

The air/fuel ratio of the air-fuel mixture for the uniform charge lean-burn combustion is selected within a range of 15–23, and the second fuel injection amount control data map and the throttle valve opening control data map for the uniform charge lean-burn combustion are determined to correspond to this range of the air-fuel ratio.

When the CPU 401 determines that the engine 1 is in a high-load operating state indicated by region D in FIG. 14, the engine 1 is controlled to effect uniform charge stoichiometric combustion in each combustion chamber 24, with an air-fuel mixture having the stoichiometric air/fuel ratio or an air/fuel ratio close to the stoichiometric value. To this end, the CPU 401 controls the SCV actuator 17a so as to fully open the swirl control valve 17, and controls the throttle actuator 40 so that the opening of the throttle valve 39 corresponds to the operating amount of the accelerator pedal 42 (as represented by the output signal of the accelerator position sensor 43). Further, the CPU 401 controls the fuel injector valve 32 in the intake stroke of each cylinder 21, to inject the fuel during the intake stroke. In this case, a stoichiometric air-fuel mixture which consists of fresh air and a fuel uniformly mixed together and the air/fuel ratio of which is equal or close to the stoichiometric value is formed over a substantially entire space in the combustion chamber 24 of each cylinder, and the stoichiometric air-fuel mixture is uniformly burned in the combustion chamber 24.

The fuel injection amount for the uniform charge stoichiometric combustion indicated above is determined on the basis of the operating amount of the accelerator pedal 42 and the engine speed. To determine the fuel injection amount or fuel injection time, the CPU 401 uses the third fuel injection amount control data map representative of the predetermined relationship among the output signal of the accelerator position sensor 43 (the operating amount of the accelerator pedal 42), the engine speed and the fuel injection amount.

The air/fuel ratio of the air-fuel mixture for the uniform charge stoichiometric combustion is selected within a range of 12–14.6, and the third fuel injection amount control data map for the stoichiometric combustion is determined to correspond to this range of the air-fuel ratio.

When the CPU 401 determines that the engine 1 is in a low/medium-load state indicated by region B in FIG. 14, which is interposed between the low-load region A and the medium-load region C, the engine 1 is controlled to effect semi-stratified charge combustion in each combustion chamber 24. To this end, the CPU 401 controls the SCV actuator 17a so as to establish an appropriate amount of opening of the swirl control valve 17, and controls the fuel injector valve 32 in the compression and intake strokes of each cylinder 21, to inject the fuel in the compression and intake strokes. In this case, a combustible air-fuel mixture is formed near the spark plug 25, and a fuel-lean air-fuel mixture is formed so as to surround the combustible air-fuel mixture, so that a semi-stratified charge is formed in the combustion chamber 24 of each cylinder. The semi-stratified charge combustion permits a smooth transition from the stratified charge combustion to the uniform charge lean-burn combustion or vise versa, without a variation in the output torque of the engine 1. The air/fuel ratio of the air-fuel mixture for the semi-stratified charge combustion is selected within a range of 20–30.

When the engine 1 is operated with a fuel-lean air-fuel mixture for the stratified charge combustion, semi-stratified charge combustion or uniform charge lean-burn combustion, the exhaust gases emitted from the engine 1 are in a fuel-lean state, and nitrogen oxides (NOx) contained in the emitted exhaust gases are occluded or absorbed in the NOx catalyst 46a. During a long operation of the engine 1 with the fuel-lean air-fuel mixture, the NOx occluding capacity of the NOx catalyst 46 is saturated, and the nitrogen oxides contained in the exhaust gases may be released into the atmosphere without being reduced or removed by the NOx catalyst 46a.

In view of the above, the CPU 401 estimates the amount of NOx which has been absorbed in the NOx catalyst 46a, on the basis of the past operating condition of the engine 1. When the amount of the NOx stored in the NOx catalyst 46a has increased to a predetermined upper limit, the CPU 401 controls the engine 1 to cause the exhaust gases to which the NOx catalyst 46a is exposed, to be fuel-rich, namely, to effect the so-called "rich spike control", for the purpose of releasing the absorbed NOx from the NOx catalyst 46a and reducing the NOx into nitrogen $N_2$.

In the fifth embodiment, the exhaust valves 28 of each cylinder 21 are opened before the moment of initiation of the normal exhaust stroke, to discharge from the combustion chamber a portion of fuel gas containing unburned combustibles, so that the NOx catalyst 46a is exposed to the fuel-rich exhaust gases containing hydrocarbon (HC).

Figure 15:
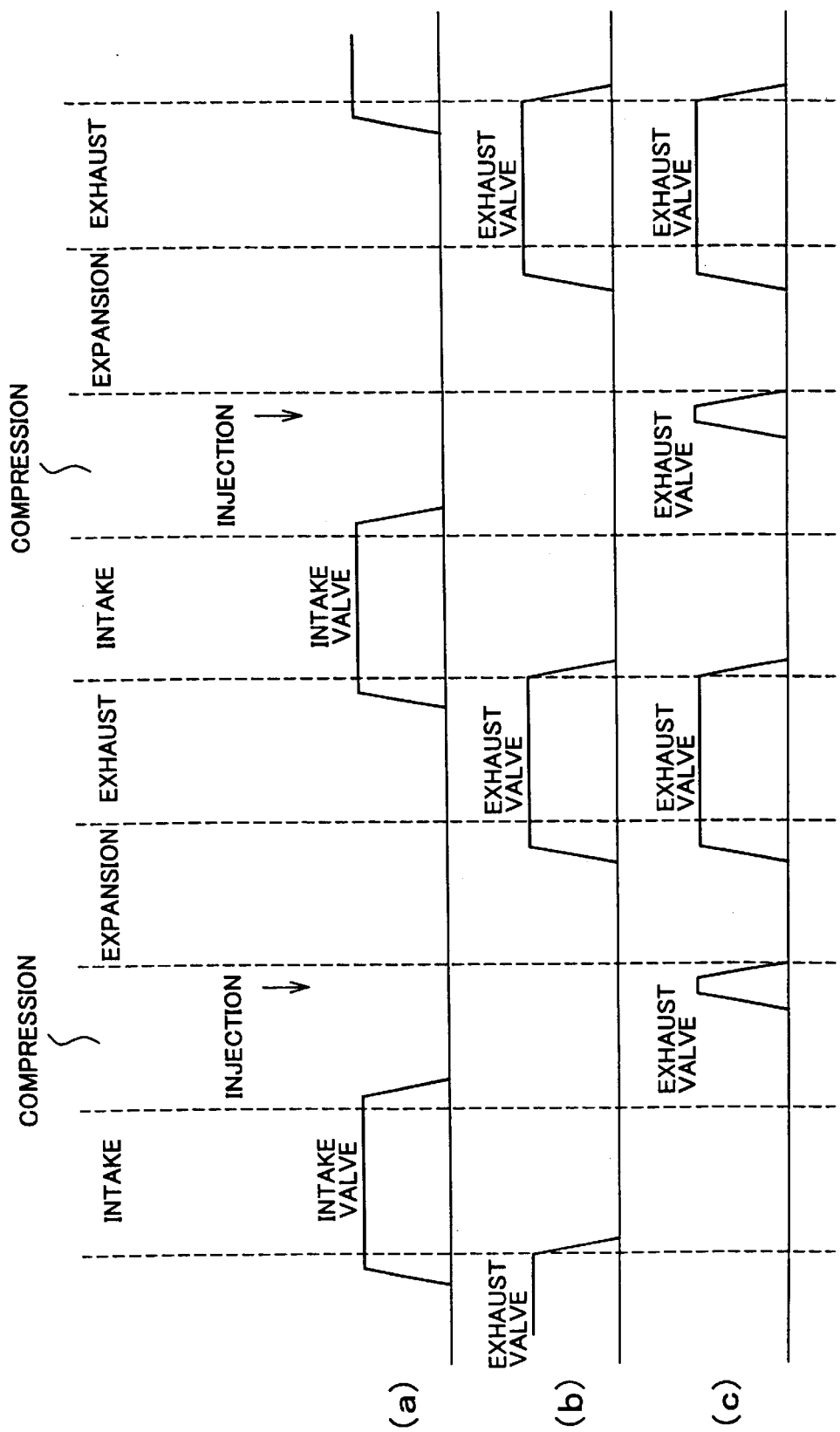
FIG. 15 is a timing chart indicating the opening and closing timing of intake and exhaust valves in the engine of FIG. 11.

Referring to FIG. 15, a control operation to cause the emitted exhaust gases to be fuel-rich will be described in which the engine 1 is operated in the stratified charge combustion mode by opening the exhaust valves 29 twice.

The timing chart of FIG. 15 indicates the timing with which the intake and exhaust valves 28, 29 are opened and closed during the operation of the engine 1 in the stratified charge combustion mode. More specifically, the opening and closing timing of the intake valves 28 is indicated at (a) in FIG. 15, and the opening and closing timing of the exhaust valves 29 in the normal lean-burn operation of the engine 1 (with the NOx being occluded in the NOx catalyst 46a) is indicated at (b), while the opening and closing timing of the exhaust valves 29 in the rich-spike control (with the NOx being released from the NOx catalyst 46a) is indicated at (c).

In the stratified charge combustion mode, the CPU 401 controls the electromagnetic intake valve drive mechanism 30 such that each intake valve 28 is opened at a point of time immediately before the moment of termination of the exhaust stroke of the piston 22, and is held open up to a point immediately after the moment of termination of the intake stroke (immediately after the moment of initiation of the compression stroke), as indicated at (a) in FIG. 15, for introducing air into each cylinder 21. Further, the CPU 401 controls each fuel injector valve 32 for injecting the fuel into the combustion chamber 24, such that the fuel injector valve 32 is opened at a point of time immediately before the moment of termination of the compression stroke of the piston 22, as also indicated at (a). The CPU 401 further controls the igniter 25a for energizing the spark plug 25 at a point immediately after the moment of injection of the fuel. Further, the CPU 401 controls the electromagnetic exhaust valve driver mechanism 31 such that the exhaust valves 29 are opened at a point of time immediately before the moment of termination of the compression stroke and is held open up to a point immediately after the moment of termination of the exhaust stroke (immediately after the moment of initiation of the intake stroke), as indicated at (b) in FIG. 15, so that the exhaust gases produced as a result of combustion of the air-fuel mixture are discharged from the combustion chamber 24. In the normal stratified charge combustion mode, the exhaust valves 29 of each cylinder 29 are opened and closed only once in each cycle of operation of the engine 1.

When the CPU 401 determines that the "rich spike control" is necessary because the amount of NOx occluded in the NOx catalyst 46a during the operation of the engine 1 in the stratified charge combustion mode has increased to the predetermined upper limit, the CPU 401 controls the exhaust valve drive mechanism 31 so that the exhaust valves 29 are open for a very short time just after the moment of injection of the fuel into the combustion chamber 24 and immediately before the moment of termination of the compression stroke, as well as being held open for the relatively long period as described above, as indicated at (c) in FIG. 15.

By opening the exhaust valves 29 just after the moment at which the fuel is injected from the fuel injector valve 32 into the combustion chamber 24, a portion of the fuel injected into the combustion chamber 24 is discharged, before the combustion of the air-fuel mixture, from the combustion chamber 24 into the exhaust ports 27 through the exhaust valves 29. As a result, the NOx catalyst 46a is exposed to fuel-rich unburned gases containing a large amount of hydrocarbon HC. Thus, the rich spike control is conducted. Consequently, the NOx occluded in the NOx catalyst 46a is released and reduced into $N_2$.

Thus, the rich spike control can be readily conducted when needed, by opening the exhaust valves 29 at two different times. This arrangement is effective to reduce the deterioration of the fuel economy of the engine 1 and to improve the efficiency of reduction and removal of the NOx, as compared with the conventional gradual change of the air/fuel ratio of the air-fuel mixture.

For the purpose of exposing the NOx catalyst 46a to unburned gases, the exhaust valves 29 are preferably opened before the ignition of the air-fuel mixture by the spark plug 25.

While the present embodiment is arranged to open the exhaust valves just after the moment of the fuel injection for conducting the rich spike control, it is possible to control the opening and closing timing of the exhaust valves 29 such that the opening action of the exhaust valves 29 is initiated just before or during the fuel injection, and such that the exhaust valves 19 are subsequently closed during or just after the fuel injection, provided that a portion of the fuel injected into the combustion chamber 24 is discharged from the combustion chamber 24 before the fuel is completely burned, desirably before the spark plug 25 is energized to ignite the air-fuel mixture.

The period of time during which the exhaust valves 29 are held open for the rich spike control may be prolonged with an increase in the engine speed or load.

Although the fifth embodiment is arranged to open twice all of the exhaust valves 29 for conducting the rich spike control, the exhaust valves 29 of selected at least one cylinder 21 may be opened twice while the remaining exhaust valves 29 are inhibited from being opened twice. Further, only one of the two exhaust ports 27 of each of selected at least one cylinder 21 may be opened twice by opening the corresponding exhaust valve 29.

While the rich spike control described above is conducted during operation of the engine 1 in the stratified charge combustion mode, at least one exhaust valve 29 may be similarly opened twice for the rich spike control during an operation of the engine 1 in the semi-stratified charge combustion mode or uniform lean-burn combustion mode.

What is claimed is:

1. An apparatus, comprising:

an internal combustion engine of a lean-burn type adapted for burning an oxygen-rich air-fuel mixture, the internal combustion engine including an intake valve and an exhaust valve for each of a plurality of cylinders thereof;

an NOx catalyst disposed in an exhaust passage of the internal combustion engine;

a variable valve control system adapted for changing the opening and closing timing of the exhaust valve for said each cylinder of the engine; and a controller configured to control the variable valve control system so as to temporarily place the exhaust valve in an open position for a period of time before a moment of initiation of an exhaust stroke of a corresponding one of the cylinders, when an exhaust gas emitted from the corresponding cylinder is desired to contain a reducing component for reducing NOx, and place the exhaust valve in the open position again during the exhaust stroke.

2. The apparatus according to claim 1, wherein the period before the moment of initiation of the exhaust stroke is a period after a moment of fuel injection and before the moment of initiation of the exhaust stroke.

3. The apparatus according to claim 1, wherein the period before the moment of initiation of the exhaust stroke is a period after a moment of fuel injection and before a moment of ignition of an air-fuel mixture by a spark plug in the corresponding cylinder.

4. The apparatus according to claim 1, wherein the period before the moment of initiation of the exhaust stroke is a period between a moment before the fuel injection and a moment during the fuel injection.

5. The apparatus according to claim 1, wherein the period before the moment of initiation of the exhaust stroke is a period between a moment during the fuel injection and a moment after the fuel injection.

6. The apparatus according to claim 1, wherein a fuel is temporarily injected into the corresponding cylinder and the exhaust valve is temporarily opened after a moment of termination of an intake stroke and before the moment of initiation of the exhaust stroke.

7. The apparatus according to claim 1, wherein the variable valve control system comprises an electromagnetic valve drive mechanism provided for the exhaust valve of each of the plurality of cylinders of the engine, the electromagnetic valve drive mechanism being adapted for changing the opening and closing timing of the exhaust valve by means of an electromagnetic force.

8. A method of controlling an exhaust gas emitted from an internal combustion engine of a lean-burn type having a variable valve control system, the internal combustion engine including an intake valve and an exhaust valve for each of a plurality of cylinders thereof, the variable valve control system being adapted for changing the opening and closing timing of the exhaust valve for said each cylinder of the engine, comprising the steps of:

placing an NOx catalyst in an exhaust passage of the internal combustion engine; and controlling the variable valve control system so as to temporarily place the exhaust valve in an open position for a period of time before a moment of initiation of an exhaust stroke of a corresponding one of the cylinders, when an exhaust gas emitted from the corresponding cylinder is desired to contain a reducing component for reducing NOx, and place the exhaust valve in the open position again during the exhaust stroke.

* * * * *